(12) United States Patent
Shimada et al.

(10) Patent No.: US 10,205,854 B2
(45) Date of Patent: Feb. 12, 2019

(54) IMAGE PROCESSING APPARATUS, IMAGE PROCESSING METHOD, AND APPEARANCE REPRODUCTION APPARATUS

(71) Applicant: CANON KABUSHIKI KAISHA, Tokyo (JP)

(72) Inventors: Takuya Shimada, Utsunomiya (JP); Shoei Moribe, Tokyo (JP); Naoya Takesue, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 54 days.

(21) Appl. No.: 15/533,240

(22) PCT Filed: Jan. 21, 2016

(86) PCT No.: PCT/JP2016/000288
§ 371 (c)(1),
(2) Date: Jun. 5, 2017

(87) PCT Pub. No.: WO2016/121346
PCT Pub. Date: Aug. 4, 2016

(65) Prior Publication Data
US 2018/0262649 A1   Sep. 13, 2018

(30) Foreign Application Priority Data

Jan. 30, 2015 (JP) .................................. 2015-017921
Jan. 30, 2015 (JP) .................................. 2015-017922
Jan. 30, 2015 (JP) .................................. 2015-017923

(51) Int. Cl.
*H04N 1/60* (2006.01)
*H04N 1/46* (2006.01)
(Continued)

(52) U.S. Cl.
CPC .............. *H04N 1/50* (2013.01); *G06T 15/506* (2013.01); *H04N 1/405* (2013.01); *H04N 1/52* (2013.01); *H04N 1/54* (2013.01); *H04N 1/60* (2013.01)

(58) Field of Classification Search
None
See application file for complete search history.

(56) References Cited

U.S. PATENT DOCUMENTS 5,883,632 A * 3/1999 Dillinger .................. H04N 1/52
345/589
6,062,137 A * 5/2000 Guo ........................ H04N 1/52
101/171
(Continued)

FOREIGN PATENT DOCUMENTS

EP   2381671 A2   10/2011
JP   2001-047732 A   2/2001
(Continued)

OTHER PUBLICATIONS

Notification of Transmittal of the International Search Report and the Written Opinion of the International Searching Authority, or the Declaration issued in corresponding application No. PCT/JP2016/000288 dated Mar. 15, 2016.

*Primary Examiner* — Madelein T Nguyen
(74) *Attorney, Agent, or Firm* — Carter, DeLuca, Farrell & Schmidt LLP

(57) ABSTRACT

Appearance data including at least color information and gloss information of an object to be reproduced is inputted. Color mapping is performed to map the color information into a color reproducible range of an appearance reproduction apparatus, based on information indicating an appearance reproducible range of the appearance reproduction apparatus. A gloss reproducible range, in which the appearance reproduction apparatus can reproduce gloss while (Continued)

keeping the color information after the color mapping, is obtained based on the information indicating the appearance reproducible range. Gloss mapping is performed to map the gloss information into the gloss reproducible range. An output signal to be outputted to the appearance reproduction apparatus is generated based on mapped appearance data including the color information after the color mapping and the gloss information after the gloss mapping.

29 Claims, 20 Drawing Sheets

(51) Int. Cl.
    *H04N 1/50*     (2006.01)
    *G06T 15/50*     (2011.01)
    *H04N 1/405*     (2006.01)
    *H04N 1/52*     (2006.01)
    *H04N 1/54*     (2006.01)

(56) References Cited

U.S. PATENT DOCUMENTS

| | | | |
|---|---|---|---|
| 7,031,021 B1* | 4/2006 | Lain | H04N 1/52 358/1.9 |
| 7,126,718 B1* | 10/2006 | Newman | H04N 1/6058 358/1.9 |
| 9,866,729 B2* | 1/2018 | Nishikawa | H04N 1/6019 |
| 2003/0001860 A1* | 1/2003 | Yamazaki | H04N 1/6058 345/590 |
| 2003/0164968 A1* | 9/2003 | Iida | H04N 1/6058 358/1.9 |
| 2005/0219585 A1* | 10/2005 | Suzuki | H04N 1/6058 358/1.9 |
| 2005/0219586 A1* | 10/2005 | Suzuki | H04N 1/6058 358/1.9 |
| 2005/0248784 A1* | 11/2005 | Henley | H04N 1/60 358/1.9 |
| 2006/0170939 A1* | 8/2006 | Misumi | H04N 1/6058 358/1.9 |
| 2007/0097389 A1* | 5/2007 | Morovic | H04N 1/6033 358/1.9 |
| 2007/0229867 A1* | 10/2007 | Suzuki | H04N 1/6058 358/1.9 |
| 2007/0291289 A1* | 12/2007 | Kuo | H04N 1/6055 358/1.9 |
| 2009/0284763 A1* | 11/2009 | Haikin | H04N 1/6033 358/1.9 |
| 2010/0110462 A1 | 5/2010 | Arai et al. | |
| 2010/0157341 A1* | 6/2010 | Mori | G09G 5/02 358/1.9 |
| 2011/0206401 A1* | 8/2011 | Sone | G03G 15/6585 399/67 |
| 2011/0216335 A1* | 9/2011 | Horita | H04N 1/60 358/1.9 |
| 2012/0038703 A1 | 2/2012 | Taya et al. | |
| 2013/0162705 A1* | 6/2013 | Tombs | B41J 2/50 347/3 |
| 2014/0205813 A1* | 7/2014 | Torigoe | B44F 11/02 428/172 |
| 2015/0022832 A1* | 1/2015 | Choulet | H04N 1/54 358/1.9 |
| 2015/0213342 A1* | 7/2015 | Fukamachi | H04N 1/6097 358/1.9 |
| 2015/0358646 A1* | 12/2015 | Mertens | H04N 1/6058 382/166 |
| 2016/0037017 A1* | 2/2016 | Morovic | H04N 1/32309 358/3.28 |
| 2016/0142587 A1 | 5/2016 | Moribe | |
| 2017/0064150 A1 | 3/2017 | Moribe | |
| 2017/0099412 A1 | 4/2017 | Shimada | |
| 2018/0063381 A1 | 3/2018 | Takesue et al. | |

FOREIGN PATENT DOCUMENTS

| | | |
|---|---|---|
| JP | 2010-246049 A | 10/2010 |
| JP | 2012-223914 A | 11/2012 |

* cited by examiner

[Fig. 1]
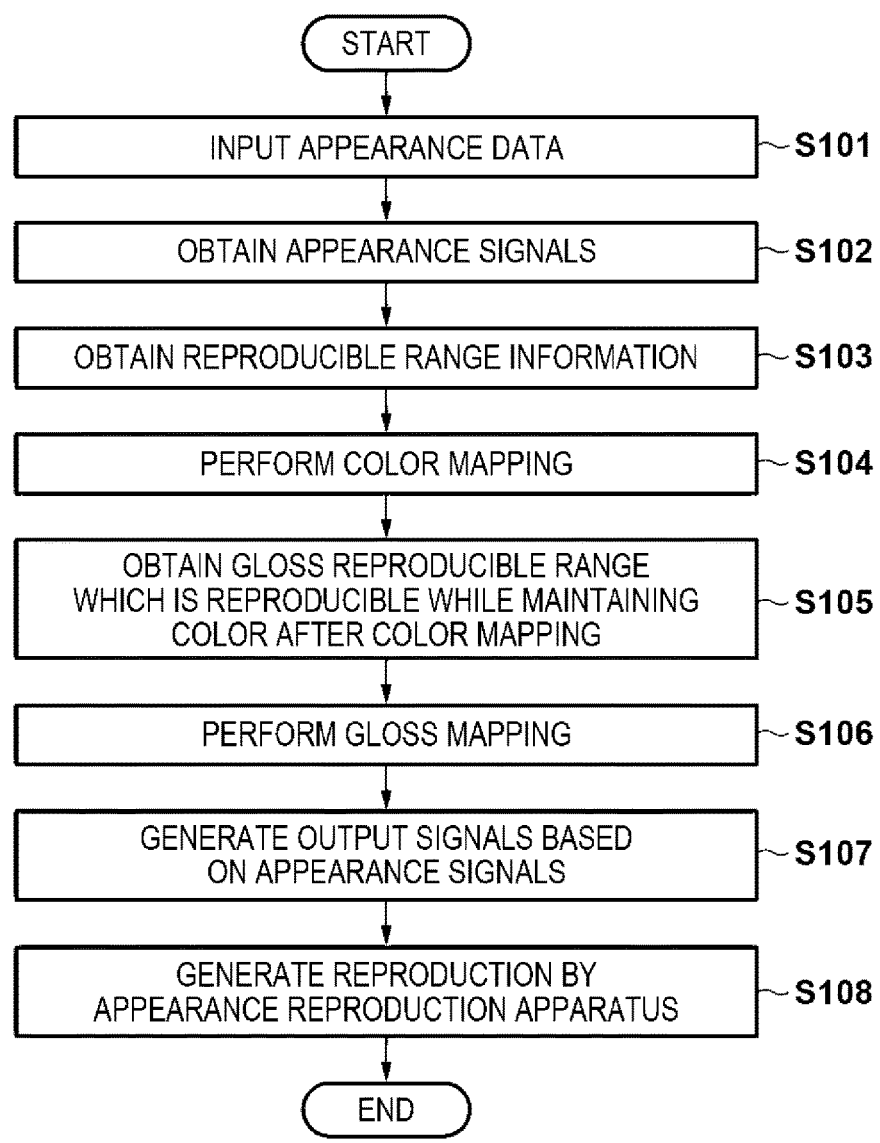

[Fig. 2]
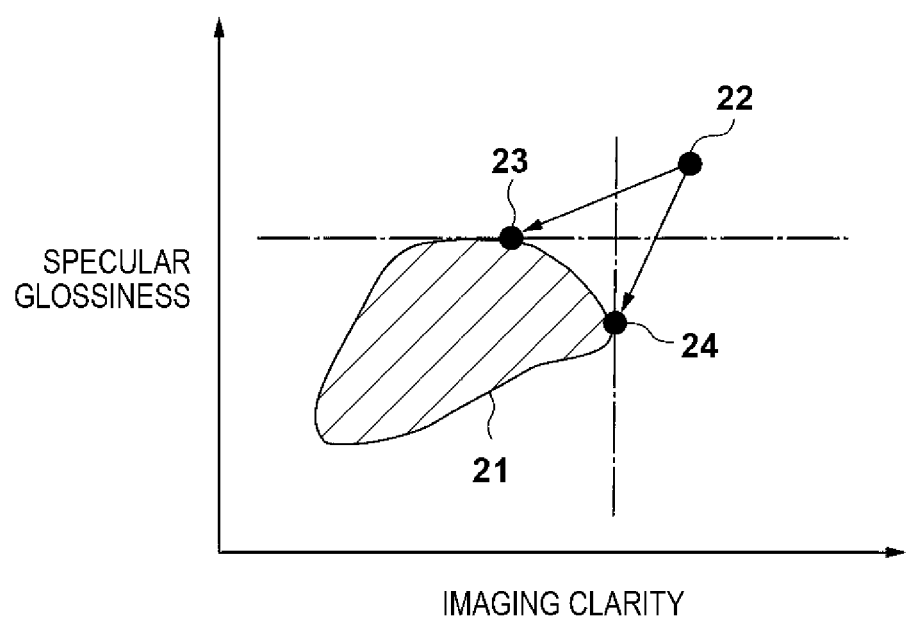

[Fig. 3]
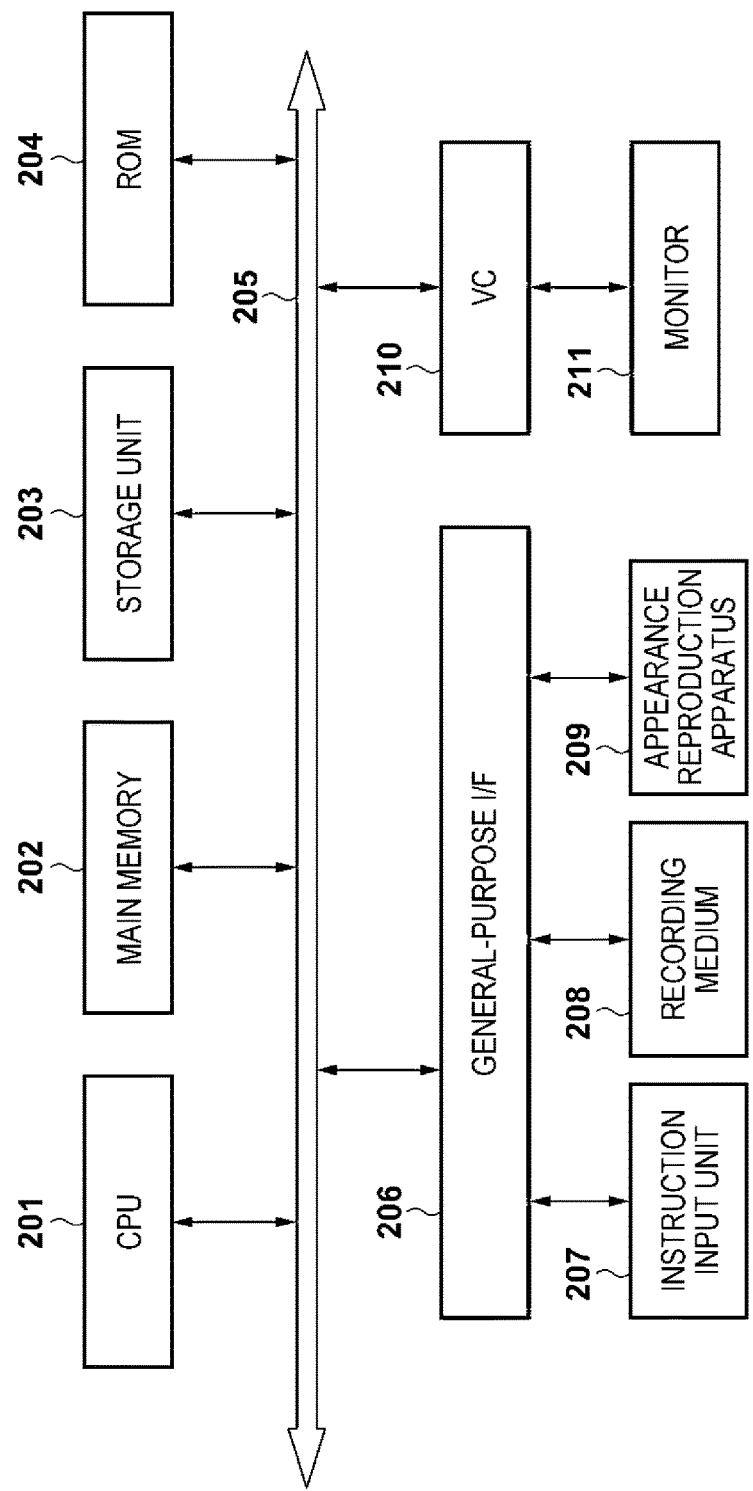

[Fig. 4]
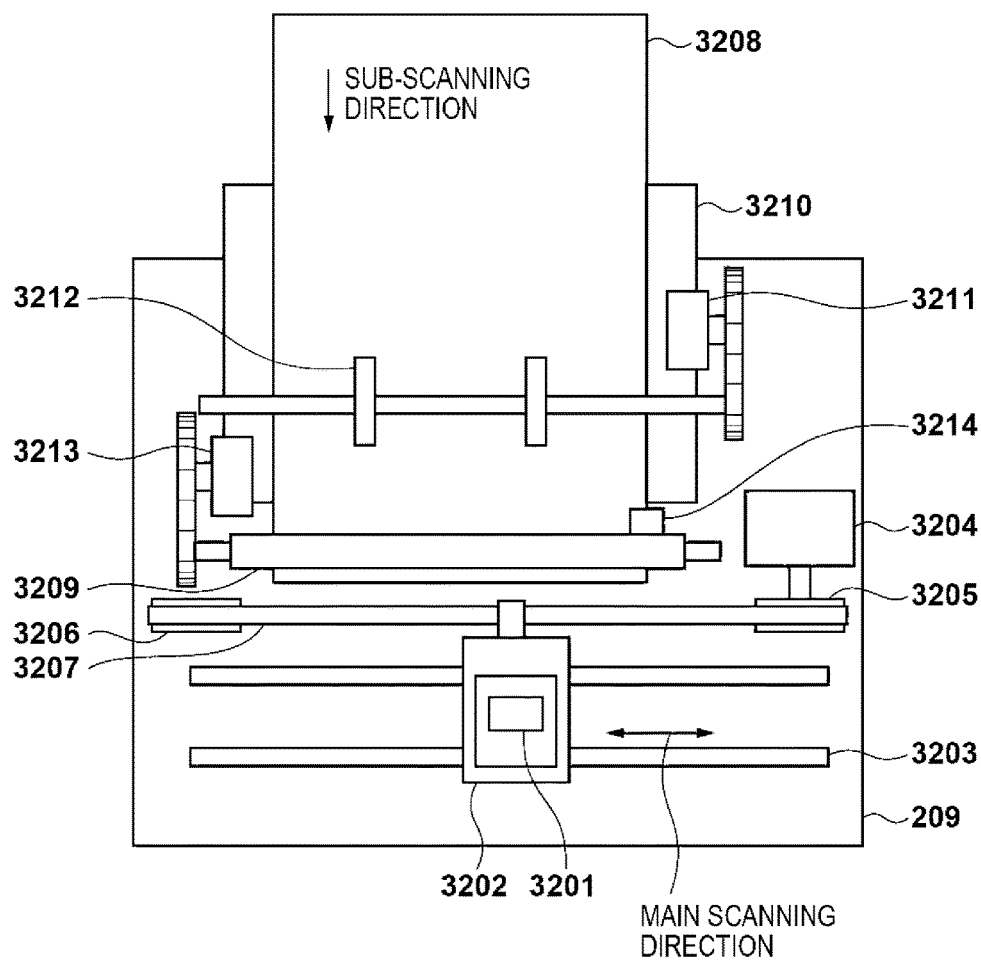
[Fig. 5]
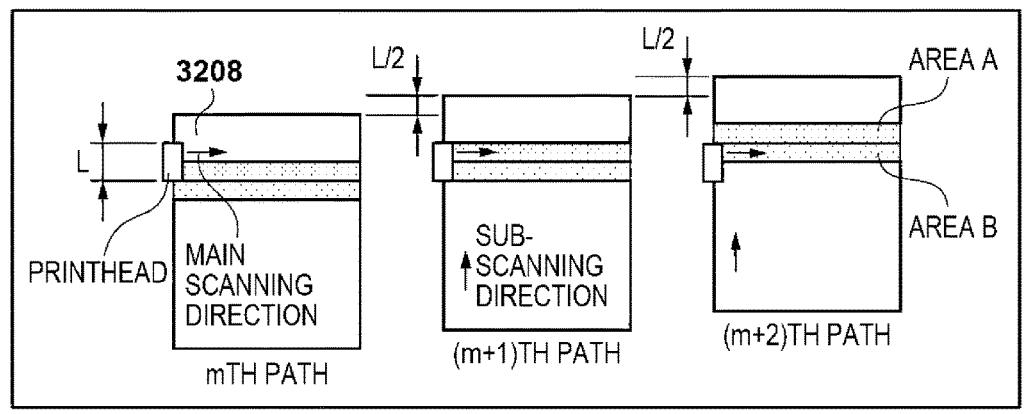

[Fig. 6A]
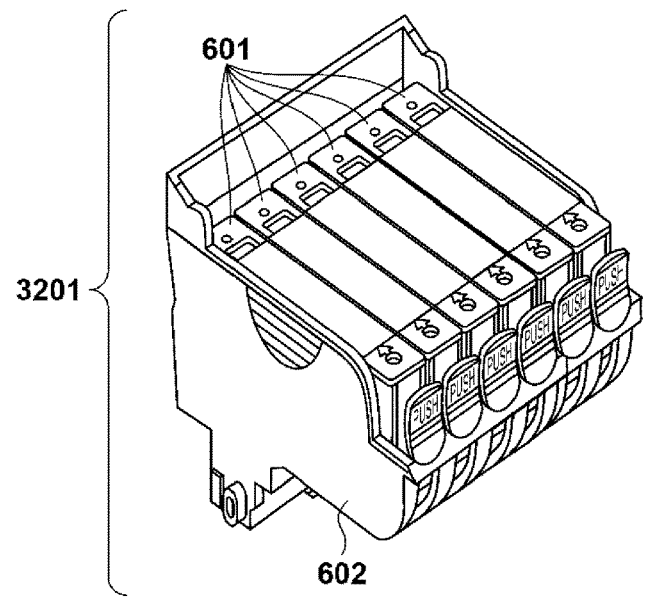
[Fig. 6B]
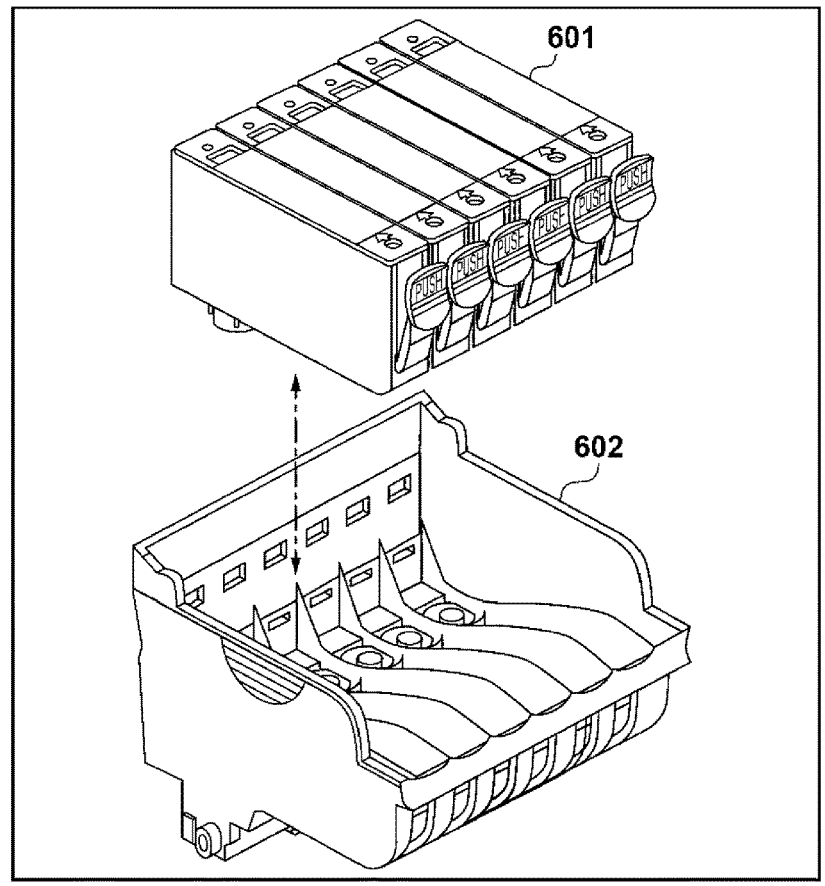

[Fig. 7]
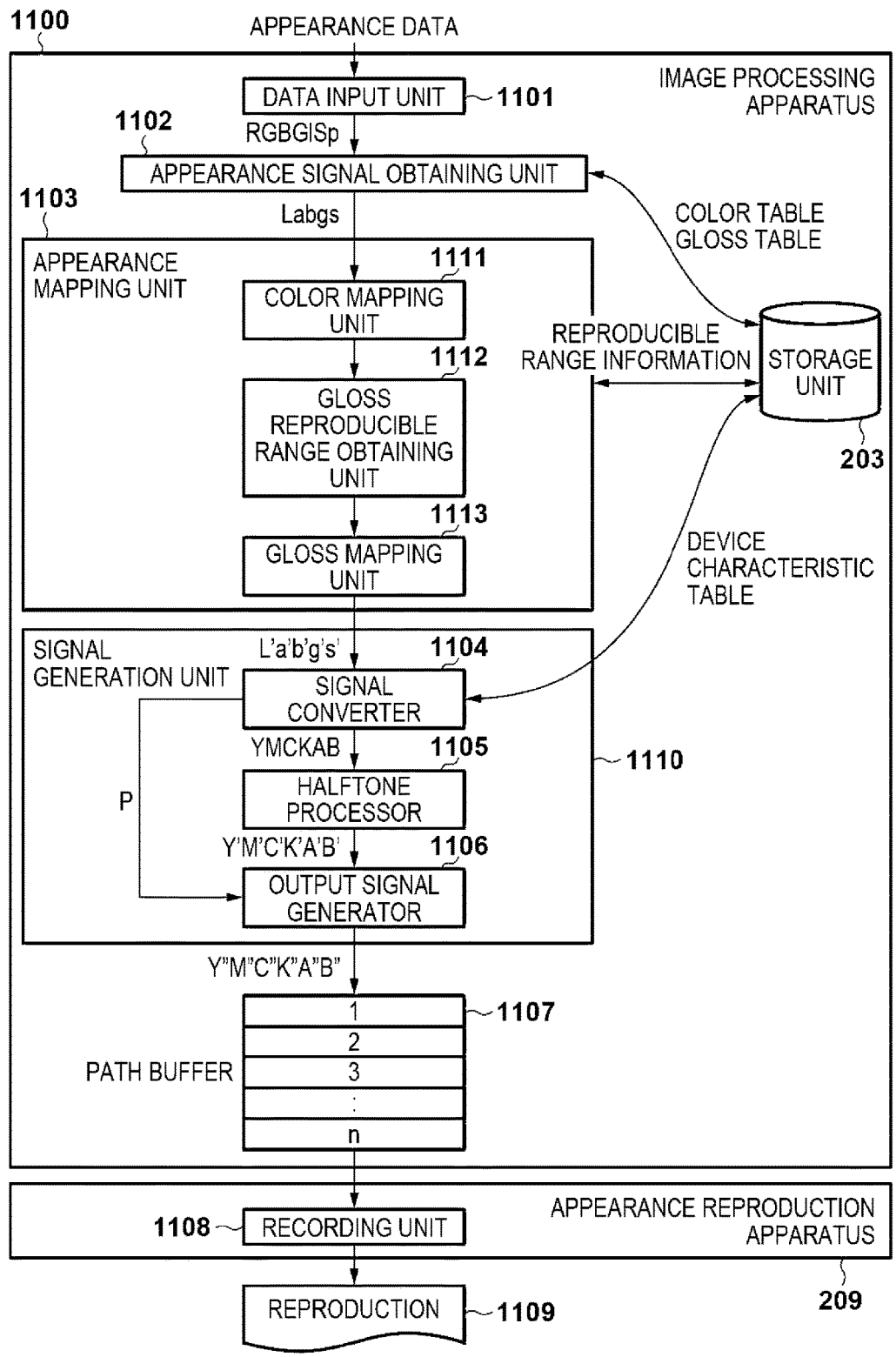

[Fig. 8]

| C | M | Y | K | A | B | P | L | a | b | g | s |
|---|---|---|---|---|---|---|---|---|---|---|---|
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |

[Fig. 9]
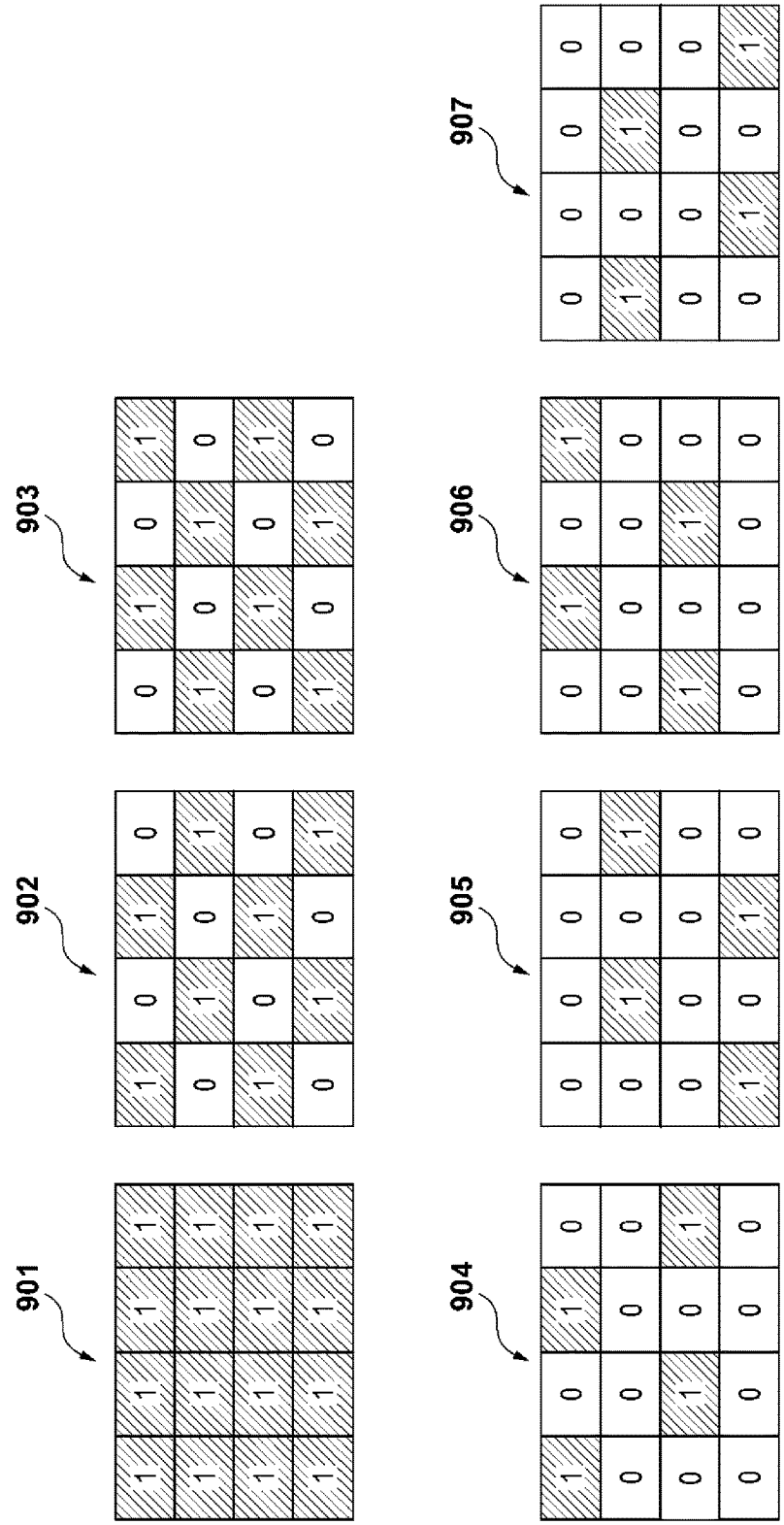

[Fig. 10]
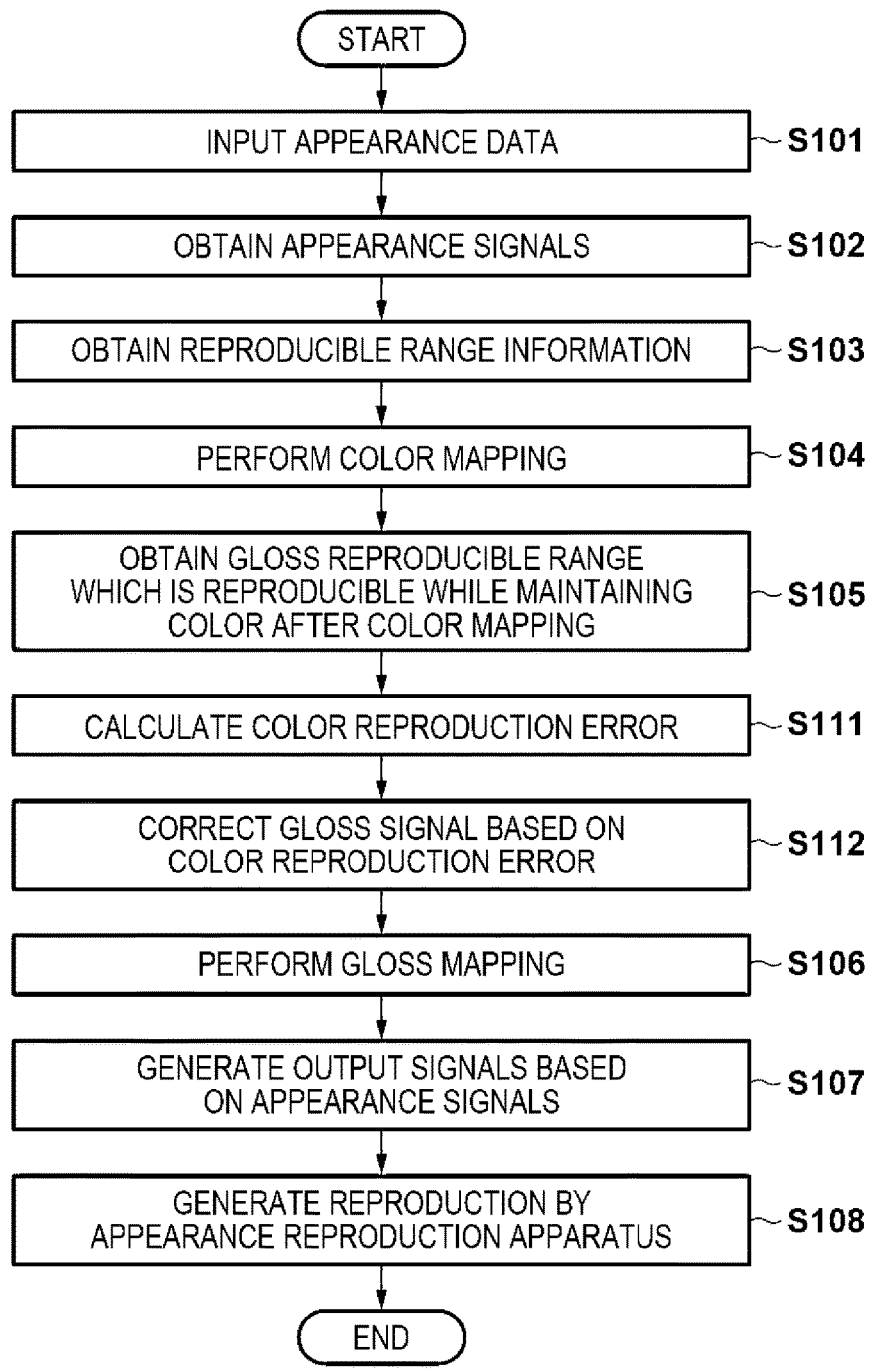

[Fig. 11]
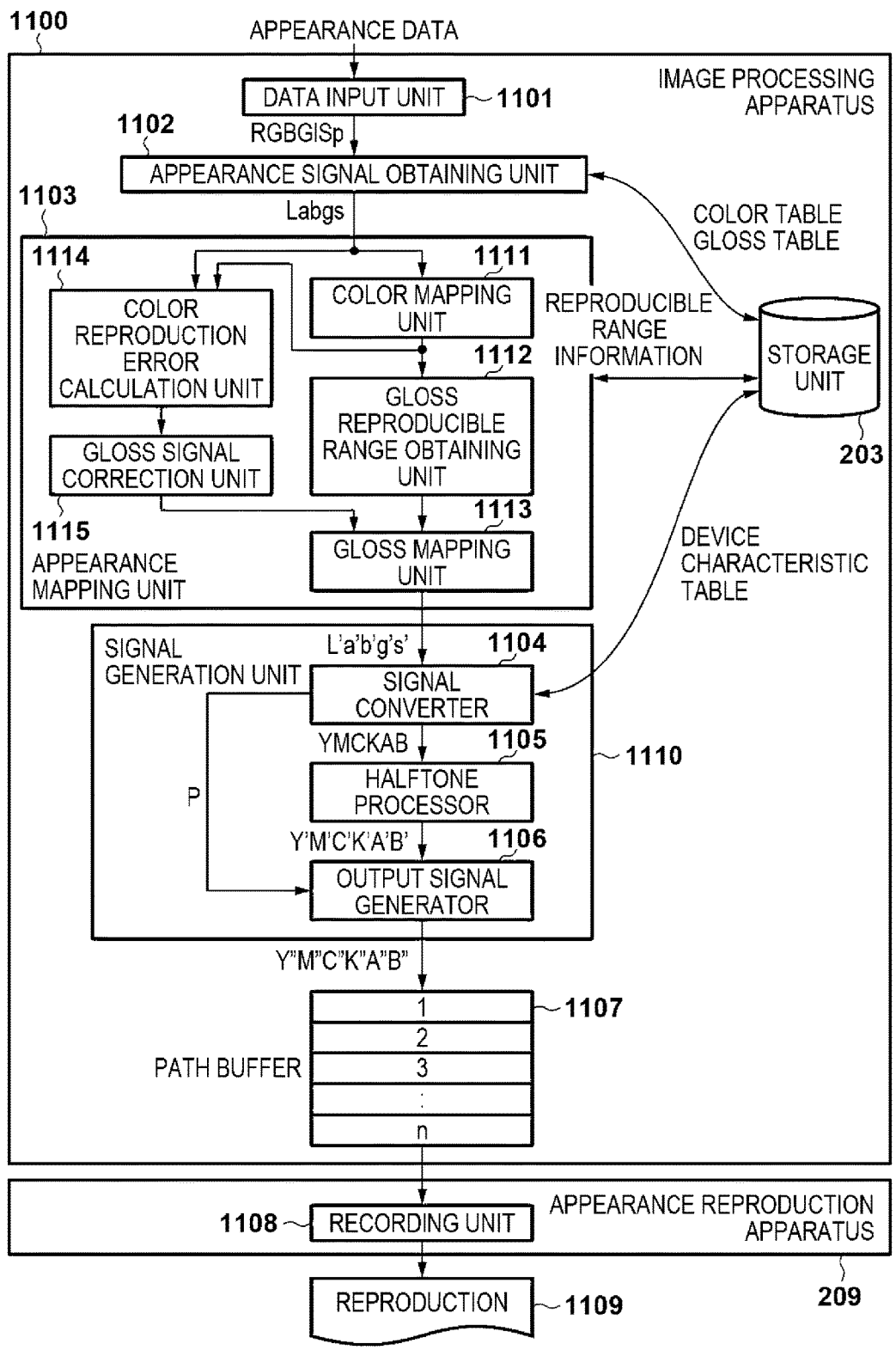

[Fig. 12]
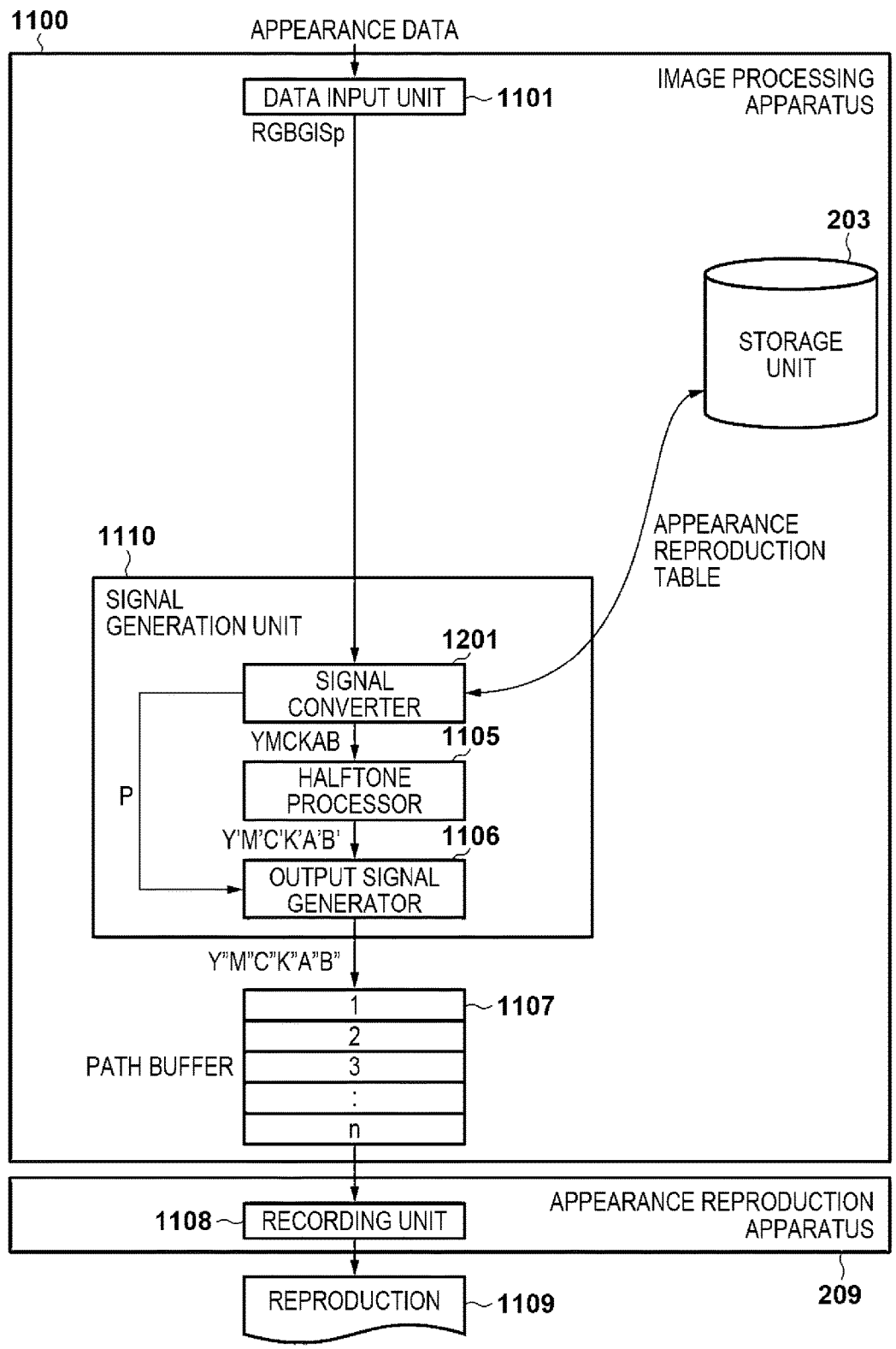

[Fig. 13]

| R | G | B | Gl | Sp | C | M | Y | K | A | B | P |
|---|---|---|---|---|---|---|---|---|---|---|---|
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |

[Fig. 14]

| COLOR \ SPECULAR GLOSSINESS | 1 | 2 | 3 |
|---|---|---|---|
| 1 | REPRODUCIBLE | REPRODUCIBLE | UN-REPRODUCIBLE |
| 2 | REPRODUCIBLE | REPRODUCIBLE | UN-REPRODUCIBLE |
| 3 | UN-REPRODUCIBLE | REPRODUCIBLE | UN-REPRODUCIBLE |
| 4 | UN-REPRODUCIBLE | REPRODUCIBLE | UN-REPRODUCIBLE |
| 5 | UN-REPRODUCIBLE | UN-REPRODUCIBLE | UN-REPRODUCIBLE |

[Fig. 15]
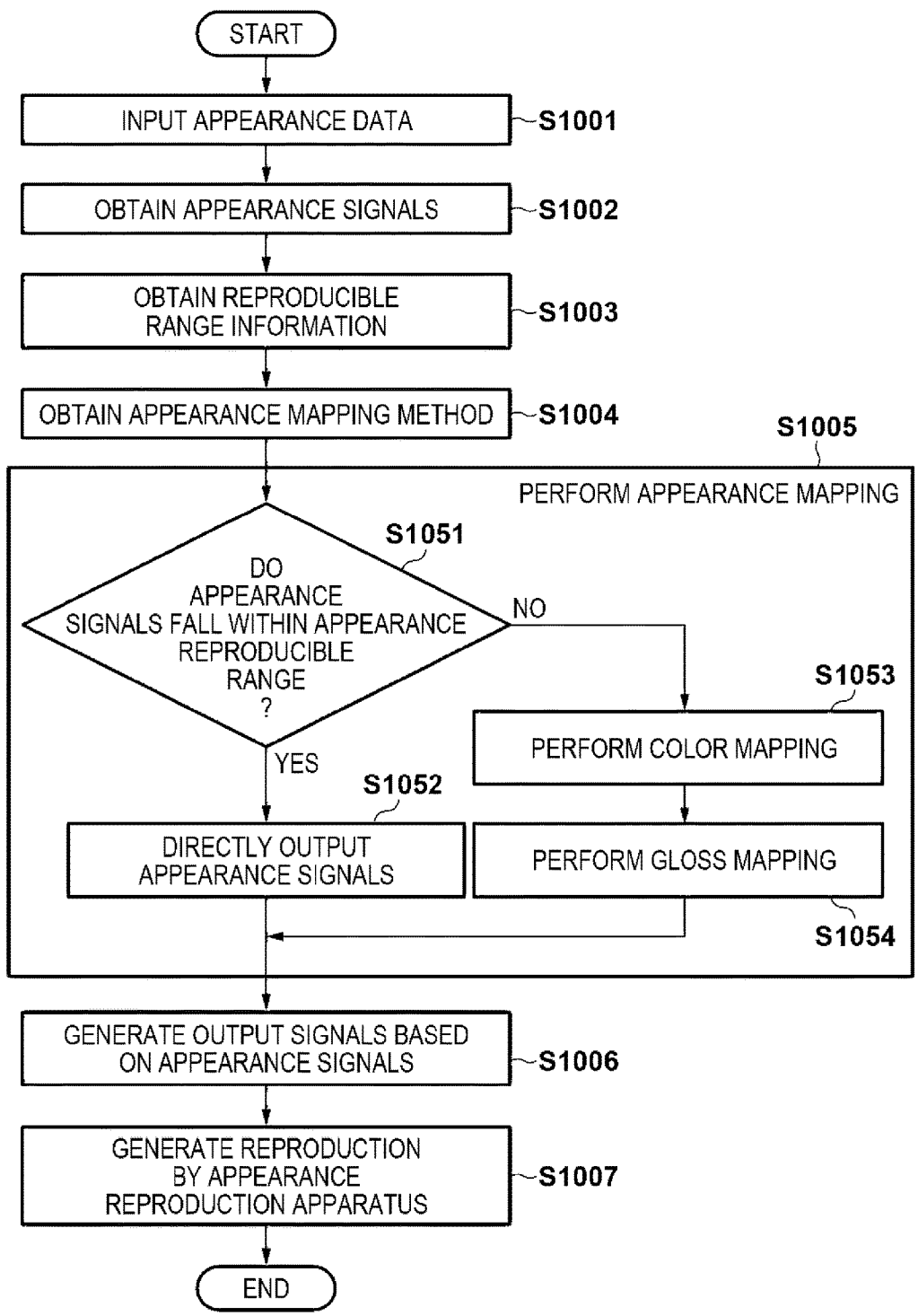

[Fig. 16]
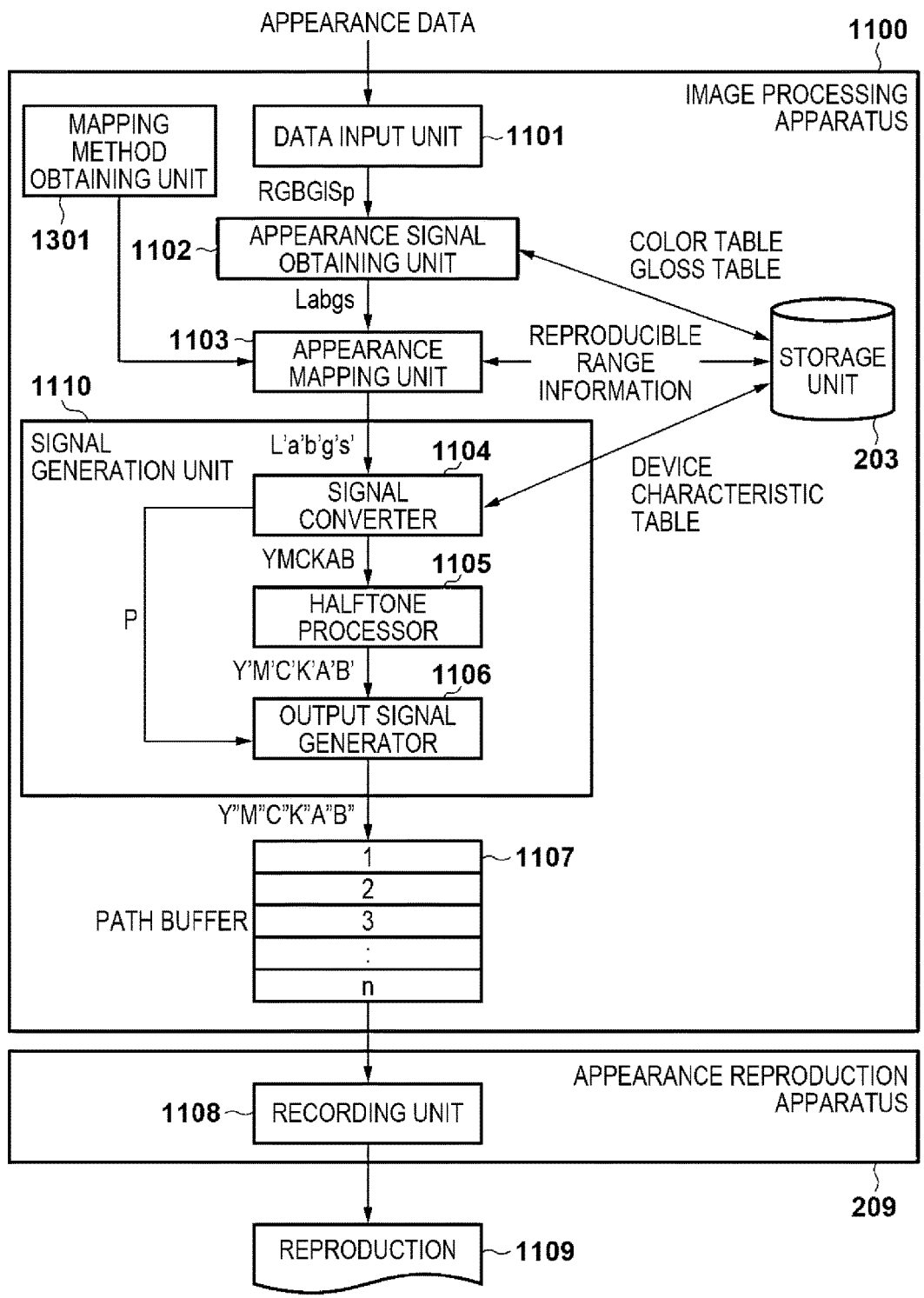

[Fig. 17A]
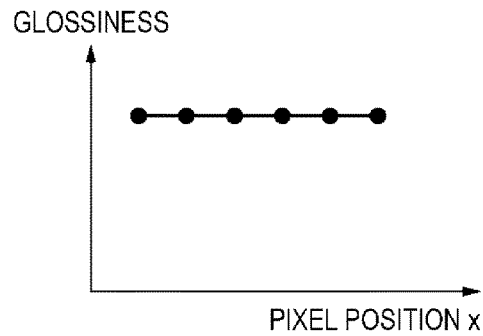
[Fig. 17B]
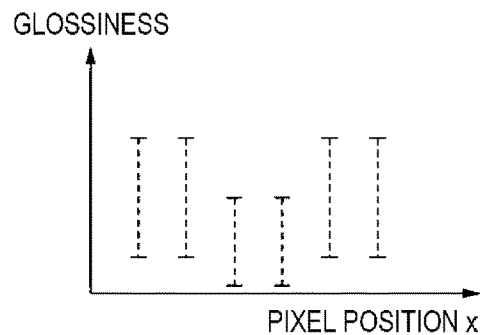
[Fig. 17C]
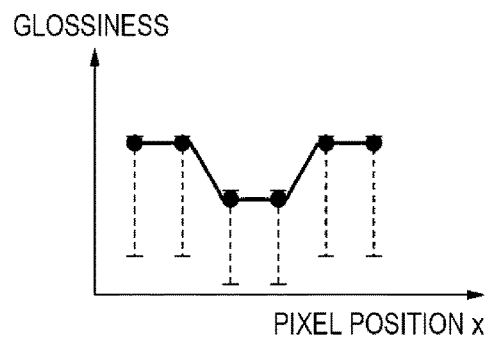
[Fig. 17D]
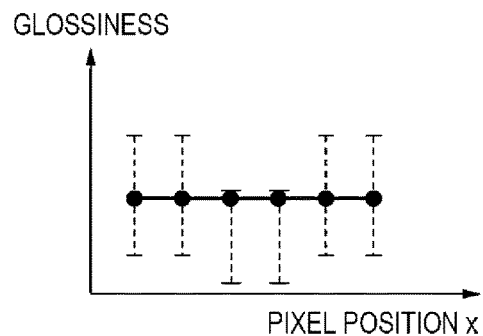

[Fig. 18]
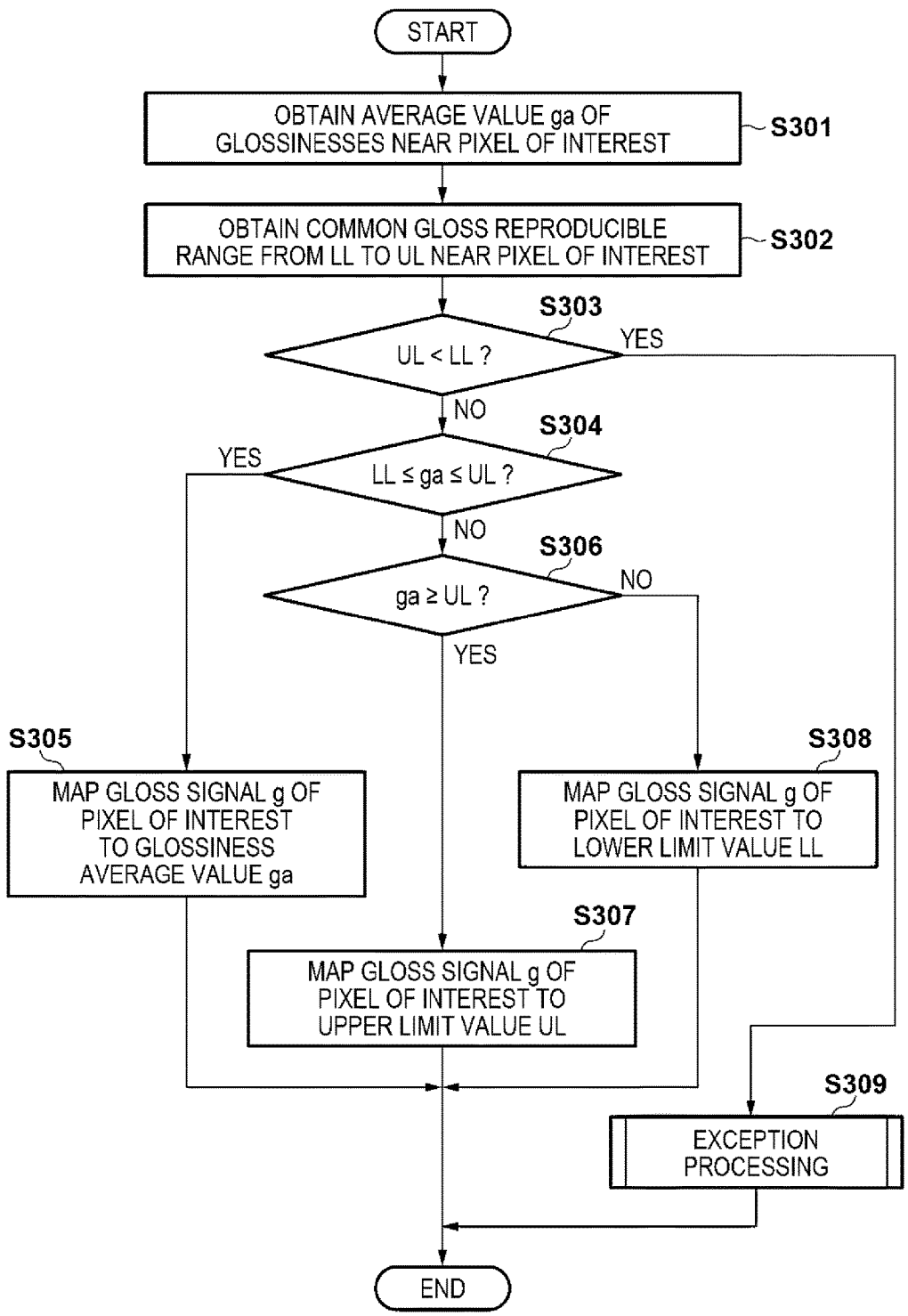

[Fig. 19]
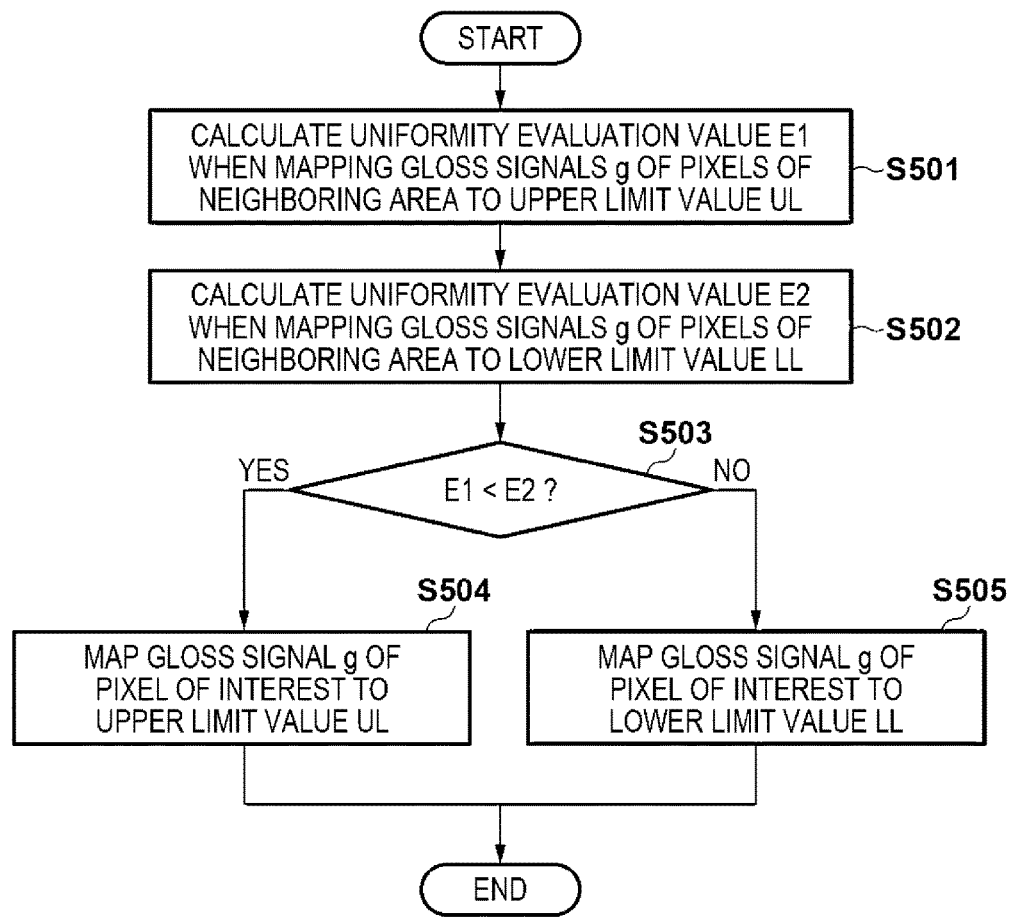

[Fig. 20A]
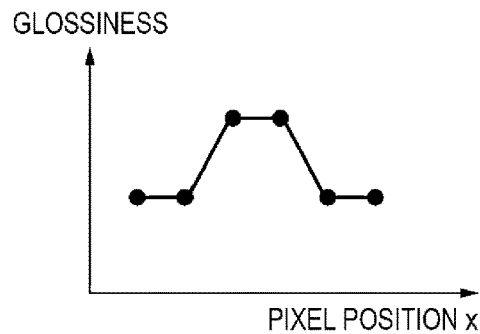
[Fig. 20B]
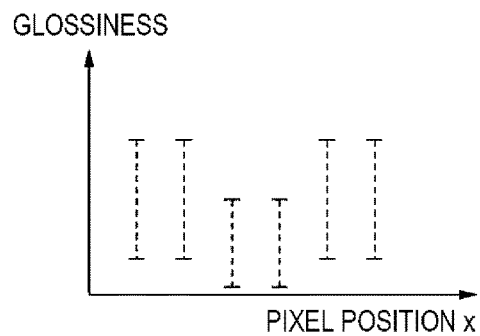
[Fig. 20C]
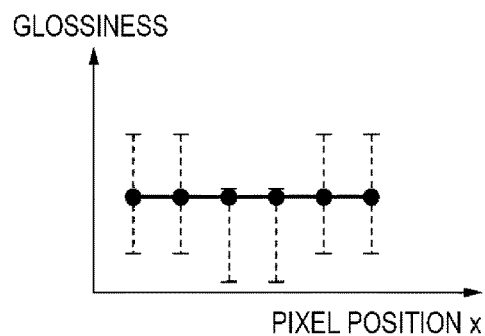
[Fig. 20D]
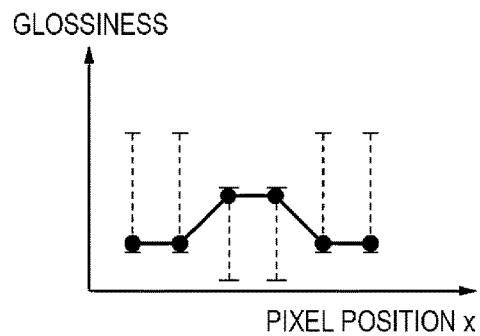

[Fig. 21]
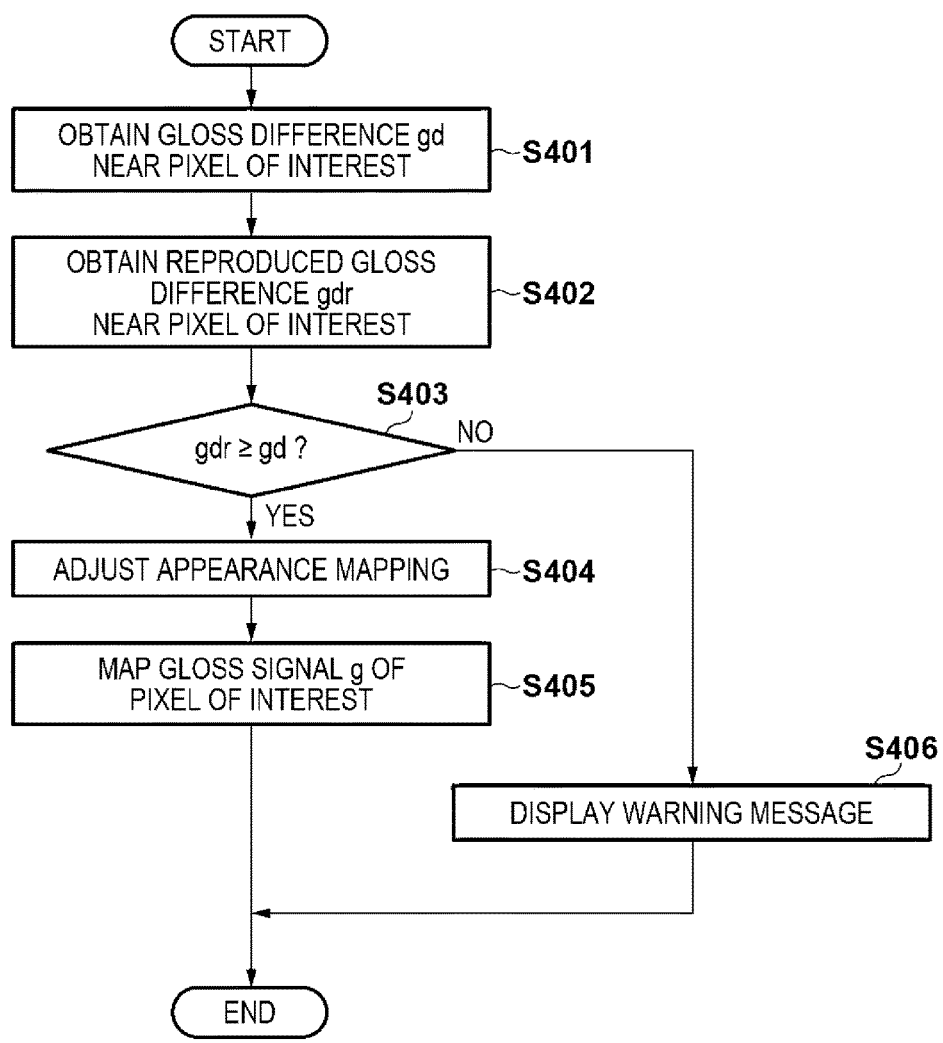

[Fig. 22]
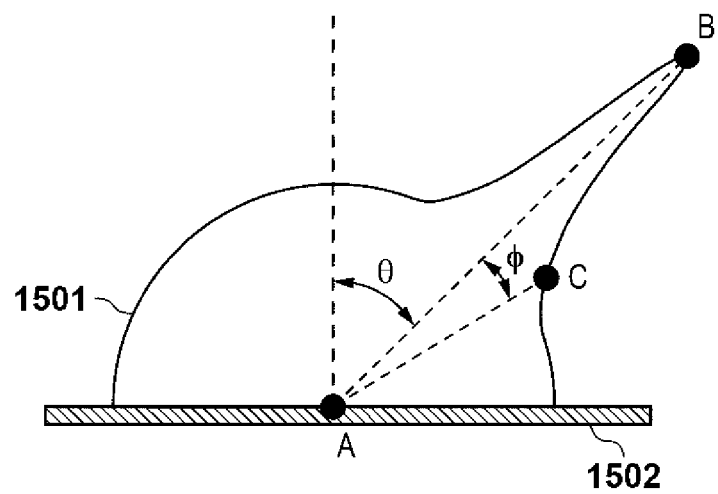

IMAGE PROCESSING APPARATUS, IMAGE PROCESSING METHOD, AND APPEARANCE REPRODUCTION APPARATUS

CROSS REFERENCE TO RELATED APPLICATIONS

This application is a U.S. National Stage entry of International Application No. PCT/JP2016/000288, filed on Jan. 21, 2016, which claims priority to Japanese Patent Application Nos. 2015-017921, 2015-017922, and 2015-017923 all filed on Jan. 30, 2015, the disclosures of each of which are hereby incorporated by reference herein in their entirety.

TECHNICAL FIELD

The present invention relates to an image processing apparatus, image processing method, and appearance reproduction apparatus for reproducing a material appearance.

BACKGROUND ART

There is a demand for a printer for reproducing a material appearance by controlling gloss and the like in addition to a color. Japanese Patent Laid-Open No. 2001-047732 (literature 1) discloses a technique of reproducing gloss by melting heat-fusible particles contained in a recording medium. In addition, Japanese Patent Laid-Open No. 2010-246049 (literature 2) discloses a technique of quantizing gloss data to satisfactorily reproduce an appearance.

The techniques disclosed in literatures 1 and 2, however, do not consider solving a mismatch between the range of the appearance of a material (to be referred to as an "object" hereinafter) to be reproduced and the range (to be referred to as an "appearance reproducible range" hereinafter) of an appearance reproducible by an appearance reproduction apparatus such as a printer. Consequently, if the range of the appearance of the object and the appearance reproducible range of the appearance reproduction apparatus do not match, it is impossible to appropriately reproduce the appearance of the object.

SUMMARY OF INVENTION

In one aspect, an image processing apparatus for performing appearance reproduction processing to reproduce material appearance, comprising: an input unit configured to input appearance data including at least color information and gloss information of an object to be reproduced; a color mapping unit configured to perform color mapping to map the color information into a color reproducible range of an appearance reproduction apparatus, based on information indicating an appearance reproducible range of the appearance reproduction apparatus; an obtaining unit configured to obtain a gloss reproducible range, in which the appearance reproduction apparatus can reproduce gloss while keeping the color information after the color mapping, based on the information indicating the appearance reproducible range; a gloss mapping unit configured to perform gloss mapping to map the gloss information into the gloss reproducible range; and a generation unit configured to generate an output signal to be outputted to the appearance reproduction apparatus, based on mapped appearance data including the color information after the color mapping and the gloss information after the gloss mapping.

In another aspect, an image processing apparatus for performing appearance reproduction processing to reproduce material appearance, comprising: an input unit configured to input appearance data including at least color information and gloss information of an object to be reproduced; an obtaining unit configured to obtain a mapping method for the appearance data; a mapping unit configured to perform appearance mapping to map the appearance data into an appearance reproducible range based on information of the appearance reproducible range of an appearance reproduction apparatus; a generation unit configured to generate an output signal to be outputted to the appearance reproduction apparatus based on mapped appearance data obtained by the appearance mapping, wherein the appearance data includes a color signal representing the color information and a gloss signal representing the gloss information, and the mapping unit performs color mapping on the color signal and performs gloss mapping according to the mapping method on the gloss signal as the appearance mapping.

In other aspect, an image processing apparatus for performing appearance reproduction processing to reproduce material appearance, comprising: an input unit configured to input appearance data including at least color information and gloss information of an object to be reproduced; and a generation unit configured to generate an output signal to be outputted to an appearance reproduction apparatus by referring an appearance reproducible table of the appearance reproduction apparatus, wherein, in a case when a verification data group is a set of the appearance data that the gloss information are equal and the color information are different from each other, the appearance reproducible table has characteristics that, in at least a subset of the verification data group, a standard deviation of the specular glossiness of a reproduction formed by the appearance reproduction apparatus based on the output signal generated from the appearance data included in the subset becomes larger than a standard deviation of specific specular glossiness of the appearance reproduction apparatus.

In other aspect, an image processing apparatus for performing appearance reproduction processing to reproduce material appearance, comprising: an input unit configured to input appearance data including at least color information and gloss information of an object to be reproduced; a gloss mapping unit configured to perform gloss mapping to map the gloss information into a gloss reproducible range, in which an appearance reproduction apparatus can reproduce gloss, based on information indicating an appearance reproducible range of the appearance reproduction apparatus; an obtaining unit configured to obtain a color reproducible range while keeping the gloss information after the gloss mapping, based on the information indicating the appearance reproducible range; a color mapping unit configured to perform color mapping to map the color information into the color reproducible range; and a generation unit configured to generate an output signal to be outputted to the appearance reproduction apparatus, based on mapped appearance data including the color information after the color mapping and the gloss information after the gloss mapping.

In other aspect, an appearance reproduction apparatus for reproducing material appearance, comprising: the above image processing apparatus, wherein the image processing apparatus is configured to output a control signal to reproduce material appearance of an object; and a recording unit configured to form a reproduction of the object using a plurality of recording materials based on the control signal.

In other aspect, an image processing method of performing appearance reproduction processing to reproduce material appearance, the method comprising: inputting appearance data including at least color information and gloss information of an object to be reproduced; performing color mapping to map the color information into a color reproducible range of an appearance reproduction apparatus, based on information indicating an appearance reproducible range of the appearance reproduction apparatus; obtaining a gloss reproducible range, in which the appearance reproduction apparatus can reproduce gloss while keeping the color information after the color mapping, based on the information indicating the appearance reproducible range; performing gloss mapping to map the gloss information into the gloss reproducible range; and generating an output signal to be outputted to the appearance reproduction apparatus, based on mapped appearance data indicated by the color information after the color mapping and the gloss information after the gloss mapping.

In other aspect, an image processing method of performing appearance reproduction processing to reproduce material appearance, the method comprising: inputting appearance data including at least color information and gloss information of an object to be reproduced; obtaining a mapping method for the appearance data; performing appearance mapping to map the appearance data into an reproducible range based on information of the appearance reproducible range of an appearance reproduction apparatus; generating an output signal to be outputted to the appearance reproduction apparatus based on mapped appearance data obtained by the appearance mapping, wherein the appearance data includes a color signal representing the color information and a gloss signal representing the gloss information, and the mapping unit performs color mapping on the color signal and performs gloss mapping according to the mapping method on the gloss signal as the appearance mapping.

In other aspect, an image processing method of performing appearance reproduction processing to reproduce material appearance, the method comprising: inputting appearance data including at least color information and gloss information of an object to be reproduced; and generating an output signal to be outputted to an appearance reproduction apparatus by referring an appearance reproducible table of the appearance reproduction apparatus, wherein, in a case when a verification data group is a set of the appearance data that the gloss information are equal and the color information are different from each other, the appearance reproducible table has characteristics that, in at least a subset of the verification data group, a standard deviation of specular glossiness of a reproduction formed by the appearance reproduction apparatus based on the output signal generated from the appearance data included in the subset becomes larger than a standard deviation of specific specular glossiness of the appearance reproduction apparatus.

In other aspect, an image processing method of performing appearance reproduction processing to reproduce material appearance, the method comprising: inputting appearance data including at least color information and gloss information of an object to be reproduced; performing gloss mapping to map the gloss information into a gloss reproducible range, in which an appearance reproduction apparatus can reproduce gloss, based on information indicating an appearance reproducible range of the appearance reproduction apparatus; obtaining a color reproducible range while keeping the gloss information after the gloss mapping, based on the information indicating the appearance reproducible range; performing color mapping to map the color information into the color reproducible range; and generating an output signal to be outputted to the appearance reproduction apparatus, based on mapped appearance data including the color information after the color mapping and the gloss information after the gloss mapping.

According to these aspects, it is possible to obtain a reproduction in which the appearance of the object is more appropriately reproduced by mapping the appearance data of the object to be reproduced to the appearance reproducible range to solve a mismatch between the appearance of the object and the appearance reproducible range.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a flowchart for explaining appearance reproduction processing according to the first embodiment.

FIG. 2 is a graph for explaining gloss mapping.

FIG. 3 is a block diagram showing the arrangement of an information processing apparatus for executing image processing according to the embodiment.

FIG. 4 is a schematic view for explaining the arrangement of an appearance reproduction apparatus.

FIG. 5 is a view for explaining multipath recording of forming an image by performing scanning on the same line of a recording sheet a plurality of times by a printhead.

FIG. 6A is a view showing an example of the arrangement of a head cartridge.

FIG. 6B is a view showing an example of the arrangement of a head cartridge.

FIG. 7 is a block diagram for explaining a processing arrangement in an appearance reproduction system according to the first embodiment.

FIG. 8 is a table showing an example of the device characteristic table of the appearance reproduction apparatus.

FIG. 9 is a view showing examples of path masks.

FIG. 10 is a flowchart for explaining appearance reproduction processing according to the second embodiment.

FIG. 11 is a block diagram for explaining a processing arrangement in an appearance reproduction system according to the second embodiment.

FIG. 12 is a block diagram for explaining a processing arrangement in an appearance reproduction system according to the third embodiment.

FIG. 13 is a table showing an example of an appearance reproduction table.

FIG. 14 is a table for explaining conditions of verification appearance signals.

FIG. 15 is a flowchart for explaining appearance reproduction processing according to the fourth embodiment.

FIG. 16 is a block diagram for explaining a processing arrangement in an appearance reproduction system according to the fourth embodiment.

FIG. 17A is a graph for explaining an example in which uniform glossiness is necessary.

FIG. 17B is a graph for explaining an example in which uniform glossiness is necessary.

FIG. 17C is a graph for explaining an example in which uniform glossiness is necessary.

FIG. 17D is a graph for explaining an example in which uniform glossiness is necessary.

FIG. 18 is a flowchart for explaining appearance mapping emphasizing gloss uniformity.

FIG. 19 is a flowchart for explaining exception processing.

FIG. 20A is a graph for explaining an example in which the tonality of glossiness is necessary.

FIG. 20B is a graph for explaining an example in which the tonality of glossiness is necessary.

FIG. 20C is a graph for explaining an example in which the tonality of glossiness is necessary.

FIG. 20D is a graph for explaining an example in which the tonality of glossiness is necessary.

FIG. 21 is a flowchart for explaining appearance mapping emphasizing the tonality of glossiness.

FIG. 22 is a view showing a typical multi-angle reflected light characteristic.

DESCRIPTION OF EMBODIMENTS

An image processing apparatus, image processing method, and appearance reproduction apparatus according to embodiments of the present invention will be described in detail below with reference to the accompanying drawings. Note that the embodiments are not intended to limit the present invention to the scope of the claims, and not all of the combinations of arrangements set forth in the embodiments are necessarily required with respect to solve the problems according to the present invention.

Appearance Reproduction

Appearance reproduction will be explained first. Note that a material to be reproduced by including an appearance will be referred to as an "object" hereinafter, and a "reproduction" is obtained by an appearance reproduction apparatus for reproducing an object. Appearance reproduction is to obtain a reproduction which looks the same as the object. A series of characteristics to be equalized between the object and the reproduction so that they look the same when comparing and observing them will be referred to as an "appearance" hereinafter.

If it is possible to quantitatively represent the appearance by a numerical value, it is possible to obtain a reproduction which looks the same as the object by generating the reproduction so that the numerical value is equal to that of the object. The numerical value representing the appearance will be referred to as an "appearance signal" hereinafter.

Assume that the appearance is formed from elements such as a color, gloss, internal scattering, and a shape. If the object is a printed material including a flat surface with a sufficiently small three-dimensional structure, it is possible to obtain a reproduction whose shape is almost the same as that of the object by recording an image on a planar medium of the same type. A difference in internal scattering in an opaque material has a small influence on a difference in appearance. In these cases, important elements for an appearance are a color and gloss, and thus an appearance can be regarded to be formed from these two elements. In other cases as well, a color and gloss are important elements for an appearance.

As color signals as numerical expressions of a color, for example, CIELAB values measured according to standard 1 and calculated according to standard 2 can be used. The CIELAB values mainly express characteristics associated with the brightness and chromaticity of diffuse reflected light. Assume that directions other than a regular reflection direction and directions near the regular reflection direction are diffuse reflection directions. In this case, the diffuse reflected light corresponds to reflected light in the diffuse reflection direction. If a reproduction is formed so that CIELAB values are equal to those of the object, it is possible to make the appearance in the diffuse reflection direction almost equal to that of the object.

Standard 1: JIS Z 8722 "Methods of colour measurement—Reflecting and transmitting objects"

Standard 2: JIS Z 8781-4 "Colorimetry—Part 4: CIE 1976 L*a*b* Colour space"

As gloss signals as numerical expressions of gloss, for example, specular glossiness measured according to standard 3, image clarity measured according to standard 4 or 5, and a reflection haze value measured according to standard 6 or 7 can be used.

Standard 3: JIS Z 8741 "Specular glossiness—Methods of measurement"

Standard 4: JIS K 7374 "Plastics—Determination of image clarity"

Standard 5: JIS H 8686-1 "Anodizing of aluminium and its alloys—Visual determination of image clarity of anodic oxidation coatings—Visual method"

Standard 6: ISO 13803 "Paints and varnishes"

Standard 7: ASTM E430 "Standard Test Methods for Measurement of Gloss of HighGloss Surfaces by Abridged Goniophotometry"

The specular glossiness represents a characteristic associated with the brightness of regular reflected light, and the image clarity and a value obtained by dividing the specular glossiness by the reflection haze represent a characteristic associated with the clarity of an illumination image included in a sample. The characteristic associated with the clarity of the illumination image will be referred to as "imaging clarity" hereinafter. High imaging clarity means that the image clarity is high and the value obtained by dividing the specular glossiness by the reflection haze is large.

It is possible to make the appearance in the regular reflection direction almost equal to that of the object by forming a reproduction so that the specular glossiness value and the imaging clarity value, that is, the image clarity and the value obtained by dividing the specular glossiness by the reflection haze are equal to those of the object.

For example, data formed from appearance signals corresponding to the CIELAB values, specular glossiness, and imaging clarity, which are measured according to the above standards, will be referred to as "appearance data" hereinafter. The appearance data is a type of image data including at least color information and gloss information of the object, and includes appearance signals for each small area. The appearance signals include, for example, color signals corresponding to the CIELAB values and gloss signals corresponding to the specular glossiness and imaging clarity. Note that the imaging clarity may be image clarity or the value obtained by dividing the specular glossiness by the reflection haze. The small area corresponding to the appearance signals will be referred to as an "area" or "pixel" hereinafter.

First Embodiment

Appearance Reproduction Processing

FIG. 1 is a flowchart for explaining appearance reproduction processing according to the first embodiment. First, appearance data of an object is input (S101). Note that if the appearance of the object is different depending on an area, appearance data corresponding to appearance signals for each area is input. For example, color image data includes appearance signals corresponding to CIELAB values for each area.

Next, appearance signals (color signals and gloss signals) are obtained from the input appearance data (S102), and information indicating the appearance reproducible range of an appearance reproduction apparatus is obtained (S103). The appearance reproducible range of the appearance reproduction apparatus is stored in advance in a storage device as information (to be referred to as "reproducible range information" hereinafter) indicating a combination of CIELAB values, specular glossiness, and imaging clarity which are reproducible in the apparatus.

Based on the color reproducible range indicated by the reproducible range information, the color signals of the appearance signals are converted into those corresponding to a color reproducible in the appearance reproduction apparatus (S104). Conversion in step S104 is "color mapping". Note that color mapping in step S104 does not refer to the gloss signals. Therefore, if the color signals are the same, even if the gloss signals are different, the color signals are converted into the same color signals.

Color mapping is performed by a known method. For example, the color signals of the appearance signals are converted into those which have a smallest color difference ΔE while maintaining a hue angle and correspond to a color reproducible by the appearance reproduction apparatus. The value of the ab hue angle defined in literature 2 and the value of CIEDE2000 defined in standard 8 can be used as the hue angle and color difference ΔE, respectively.

Standard 8: JIS Z 8730 "Colour specification-Colour differences of object colours"

Based on the reproducible range information, a gloss reproducible range which is reproducible while maintaining a color after color mapping is obtained (S105). That is, a combination of the values of imaging clarity and specular glossiness including the CIELAB values of the color signals after color mapping is extracted from the reproducible range information. The extracted combination of the values of imaging clarity and specular glossiness corresponds to the gloss reproducible range which reproducible while maintaining the color after color mapping.

The gloss signals of the appearance signals are converted into those corresponding to gloss within the gloss reproducible range (step S106). Conversion in step S106 will be referred to as "gloss mapping". That is, based on the gloss reproducible range obtained in step S105, the gloss signals are converted into those within the gloss reproducible range. In other words, the gloss signals are converted into those corresponding to gloss which is reproducible while maintaining the color after color mapping.

Note that gloss mapping according to the first embodiment is performed based on a color mapping result. Therefore, even if the gloss signals of the appearance data are the same, if the color signals of the appearance data are different, the gloss signals may not be converted into the same gloss signals.

Output signals to be output to the appearance reproduction apparatus are generated based on the color signals after color mapping and the gloss signals after gloss mapping (step S107). The appearance reproduction apparatus is, for example, an image recording apparatus such as a printer and the output signals are, for example, signals associated with the amounts of recording materials of the image recording apparatus. A detailed description thereof will be provided later.

The appearance reproduction apparatus generates a reproduction based on the output signals (step S108). Note that with respect to the "appearance data" formed from the appearance signals, data formed from the output signals will be referred to as "control data" hereinafter. In other words, steps S104 to S106 are steps of converting the input appearance data into that corresponding to an appearance reproducible by the appearance reproduction apparatus. Furthermore, step S107 is a step of converting the appearance data obtained in steps S104 to S106 into control data of the appearance reproduction apparatus.

Note that the above procedure is merely an example. For example, the reproducible range information may be obtained before the appearance data is input.

Gloss Mapping

Gloss mapping will be described with reference to FIG. 2. In a graph shown in FIG. 2, the abscissa represents an imaging clarity value, the ordinate represents a specular glossiness value, an area 21 indicates a gloss reproducible range, and a point 22 indicates a gloss signal of appearance signals. If, for example, reproduction is performed by emphasizing specular glossiness, the gloss signal is converted into that to which the specular glossiness in the gloss reproducible range 21 is closest. In the example shown in FIG. 2, the gloss signal 22 is mapped to a point 23, and a gloss signal close to the specular glossiness of the input appearance data is output. As a result, a reproduction with a small difference with respect to the specular glossiness indicated by the input appearance data is obtained.

If reproduction is performed by emphasizing imaging clarity, the gloss signal is converted into that to which the imaging clarity value in the gloss reproducible range 21 is closest. In the example shown in FIG. 2, the gloss signal 22 is mapped to a point 24, and a gloss signal close to the imaging clarity of the input appearance data is output. As a result, a reproduction with a small difference with respect to the imaging clarity indicated by the input appearance data is obtained.

If it is desired to make both the specular glossiness and imaging clarity close to those of the appearance data, the gloss signal 22 is mapped to a closest point on the boundary of the gloss reproducible range 21.

Apparatus Arrangement

FIG. 3 is a block diagram showing the arrangement of an information processing apparatus for executing image processing according to an embodiment. A microprocessor (CPU) 201 executes programs stored in a storage unit 203 such as a hard disk drive (HDD) or solid-state drive (SSD) and a read only memory (ROM) 204 using a main memory 202 such as a random access memory (RAM) as a work memory, thereby controlling components (to be described later) through a system bus 205. Note that the storage unit 203 and ROM 204 store programs and various data for implementing the above-described appearance reproduction processing (S101 to S107) for reproducing the material appearance.

An instruction input unit 207 such as a keyboard and mouse, a recording medium (computer-readable recording medium) 208 such as a USB memory or memory card, an appearance reproduction apparatus 209, and the like are connected to a general-purpose interface (I/F) 206 such as USB (Universal Serial Bus). Furthermore, the CPU 201 displays, on a monitor 211 connected to a video card (VC) 210, a user interface (UI) and information indicating the progress of processing and the result of processing.

For example, in accordance with a user instruction input through the instruction input unit 207, the CPU 201 loads, into a predetermined area of the main memory 202, an application program (AP) stored in the ROM 204, the storage unit 203, or the recording medium 208. The CPU 201 executes the AP to display a UI on the monitor 211 in accordance with the AP.

In accordance with a user instruction, the CPU 201 loads various data stored in the storage unit 203 and recording medium 208 into a predetermined area of the main memory 202. In accordance with the AP, the CPU 201 performs predetermined arithmetic processing for the various data loaded in the main memory 202. In accordance with a user instruction, the CPU 201 displays the arithmetic processing result on the monitor 211, stores it in the storage unit 203 or the recording medium 208, and outputs it to the appearance reproduction apparatus 209. In addition, the CPU 201 can obtain various kinds of information from the appearance reproduction apparatus 209 through the general-purpose I/F 206.

Note that the CPU 201 can transmit/receive programs, data, and arithmetic processing results to/from a computer apparatus or server apparatus on a wired or wireless network through a network I/F (not shown) connected to the system bus 205. The monitor 211 and instruction input unit 207 may be overlaid to form a touch panel. In this case, the information processing apparatus is a computer device such as a tablet device or smartphone.

Arrangement of Appearance Reproduction Apparatus

FIG. 4 is a schematic view for explaining the arrangement of the appearance reproduction apparatus 209. Note that FIG. 4 exemplifies an inkjet image forming apparatus as the appearance reproduction apparatus 209.

A head cartridge 3201 interchangeably mounted on a carriage 3202 includes a printhead with a plurality of recording elements corresponding to a plurality of recording material orifices, and ink tanks each for supplying ink as a recording material to the printhead. The head cartridge 3201 also includes a connector for transmitting/receiving a signal of the printhead such as a driving signal of each recording element.

The carriage 3202 includes a connector holder for transmitting a signal to the head cartridge 3201 through the connector, and can reciprocate along a guide shaft 3203. That is, the position and movement of the carriage 3202 are controlled by a driving mechanism including a motor pulley 3205, driven pulley 3206, and timing belt 3207 using a main scanning motor 3204 as a driving source. The orifice surface of the head cartridge 3201 is held so as to extend downward from the carriage 3202 and becomes parallel to a recording sheet 3208. The movement of the carriage 3202 along the guide shaft 3203 is called "main scanning", and the moving direction is called a "main scanning direction".

The recording sheets 3208 are set on an auto sheet feeder (ASF) 3210. In image formation, a sheet feed motor 3211 drives pickup rollers 3212 through a gear, and the recording sheets are separated and fed one by one from the ASF 3210. By rotation of a conveyance roller 3209, the recording sheet 3208 is conveyed to a recording start position facing the orifice surface of the head cartridge 3201 on the carriage 3202. The conveyance roller 3209 is driven by a line feed (LF) motor 3213 through a gear. Whether the recording sheet 3208 has been conveyed to the recording start position is determined by detecting, by a paper end sensor 3214, passage of the recording sheet 3208.

After the recording sheet 3208 is conveyed to the recording start position, the carriage 3202 moves above the recording sheet 3208 along the guide shaft 3203. During the movement, ink is discharged from the orifices of the printhead in response to a driving signal. When the carriage 3202 reaches one end of the guide shaft 3203, the conveyance roller 3209 conveys the recording sheet 3208 by a predetermined distance in a direction perpendicular to the main scanning direction. The conveyance of the recording sheet 3208 is called "paper feed" or "sub-scanning", and the conveyance direction is called a "paper feed direction" or "sub-scanning direction".

After the end of the paper feed of the recording sheet 3208, the carriage 3202 moves again along the guide shaft 3203 and ink is discharged from the orifices of the printhead in response to a driving signal. By repeating the main scanning and the paper feed (sub-scanning) by the carriage 3202, an image is formed on the recording sheet 3208.

Multipath recording of forming an image by performing scanning on the same line of the recording sheet 3208 a plurality of times by the printhead will be described with reference to FIG. 5. FIG. 5 shows 2-path recording in which, for example, image recording for a recording width L of the printhead is performed in main scanning and every time recording for one main scanning operation ends, the recording sheet 3208 is conveyed by a distance L/2 in the sub-scanning direction. Recording of area A shown in FIG. 5 is completed by the mth main scanning operation and (m+1)th main scanning operation. Recording of area B is completed by the (m+1)th main scanning operation and (m+2)th main scanning operation.

When n-path recording is performed, the recording sheet 3208 is conveyed by the distance L/n in the sub-scanning direction every time recording for one main scanning operation ends, and the printhead performs main scanning n times on the same line of the recording sheet 3208, thereby forming an image. Note that the recording width L corresponds to the length in the sub-scanning direction of the orifice array, and corresponds to the length in the sub-scanning direction of an area recordable by performing one main scanning operation by the appearance reproduction apparatus 209.

In general, as a recording path count is larger, the time taken to form an image becomes longer. However, the influence of variations of the discharge amounts and discharge directions of the ink orifices of the printhead is suppressed to make density unevenness less conspicuous. Furthermore, as the recording path count is larger, it is possible to extend the appearance reproducible range. In addition, the ink amount recorded by one path becomes smaller, and dots formed by one path are distributed. By recording of a plurality of paths, granular dots are superimposed to form a small three-dimensional structure on the surface of the recording sheet 3208. As a result, scattering of surface reflected light becomes large, thereby reproducing gloss with low imaging clarity.

Conversely, if the recording path count is limited and an image is formed by a small recording path count, the ink amount recorded by one path becomes large, and the ink forms a layer to contribute to smoothing of the surface of the recording sheet 3208. As a result, scattering of surface reflected light becomes small, thereby reproducing gloss with high imaging clarity. Note that the level of a three-dimensional surface structure to be formed depends on the physical properties of the recording materials, and changes depending on the types of recording materials. The amounts of recording materials also change depending on a color to be reproduced. Therefore, a controllable imaging clarity range is different depending on the color. In other words, an imaging clarity reproducible range changes depending on the color.

When performing n-path recording in multipath recording shown in FIG. 5, the recording sheet 3208 is conveyed in the sub-scanning direction by the distance L/n for one main scanning operation, and thus the recording width in the one main scanning operation is represented by L/n. On the other hand, in this embodiment, the appearance reproduction apparatus generates a reproduction by setting, as a unit recording area, an area recordable by one main scanning operation, and performing a main scanning operation for the same unit recording area a plurality of times. A detailed description thereof will be provided later.

Printhead

FIGS. 6A and 6B show an example of the arrangement of the head cartridge 3201. The head cartridge 3201 includes ink tanks 601 each storing ink as a recording material, and a printhead 602 for discharging the ink supplied from the ink tank 601 in accordance with a discharge signal. The head cartridge 3201 individually includes ink tanks of, for example, yellow Y, magenta M, cyan C, black K, first gloss adjustment material A, and second gloss adjustment material B. Each ink tank 601 is detachable from the printhead 602, as shown in FIG. 6B.

First gloss adjustment material A and second gloss adjustment material B are desirably colorless transparent materials with different refractive indices. However, the gloss adjustment materials may be slightly colored materials which are not completely transparent, and need only be materials close to colorless transparent materials. The refractive index of gloss adjustment material A is higher than that of gloss adjustment material B.

An area in which gloss adjustment material A with a high refractive index is recorded on the top surface of a recording surface has a high reflectance, and can reproduce gloss with high specular glossiness. Conversely, an area in which gloss adjustment material B with a low refractive index is recorded on the top surface has a low reflectance, and can reproduce gloss with low specular glossiness. By adjusting the use ratio of gloss adjustment materials A and B in an area, it is possible to reproduce intermediate specular glossiness between the specular glossiness obtained by solely using gloss adjustment material A and that obtained by solely using gloss adjustment material B.

Note that the total amount of recordable recording materials is limited. Furthermore, since color material amounts to be used change depending on a color to be reproduced, the amounts of usable gloss adjustment materials change depending on a color. Therefore, a controllable specular glossiness range is different depending on a color. In other words, a specular glossiness reproducible range changes depending on a color.

Processing Arrangement in Appearance Reproduction System

FIG. 7 is a block diagram for explaining a processing arrangement in an appearance reproduction system. A processing arrangement and functions shown in FIG. 7 are implemented by the operation of an image processing apparatus 1100 implemented when the CPU 201 executes the program for the above-described image processing (S101 to S107) and the operation of the appearance reproduction apparatus 209 based on an instruction of the CPU 201.

A data input unit 1101 inputs appearance data formed by appearance signals from the storage unit 203, the recording medium 208, a server apparatus (not shown), or the like. The appearance signals include color signals and gloss signals, and each pixel of the appearance data has gloss signals GlSp in addition to general color signals RGB. The gloss signal Gl is a signal corresponding to specular glossiness, and the gloss signal Sp is a signal corresponding to imaging clarity.

The appearance signals RGBGlSp forming the appearance data indicate a digital signal of 40 bits in total, which includes 8-bit elements. Note that the format of the appearance data is not limited to the above one. For example, two types of data, that is, image data formed from the color signals RGB and gloss data formed from the gloss signals GlSp may be input.

An appearance signal obtaining unit 1102 converts the input appearance signals into color signals Lab corresponding to CIELAB values, a gloss signal g corresponding to specular glossiness, and a gloss signal s corresponding to imaging clarity. Appearance signals Labgs output from the appearance signal obtaining unit 1102 are preferably device independent signals corresponding to measured values.

A conversion method defined for a standard color space such as sRGB or AdobeRGB is used to convert the color signals RGB into the color signals Lab. Alternatively, the color signals Lab corresponding to the color signals RGB may be calculated using a known interpolation operation of referring to a color table (three-dimensional lookup table) in which the correspondence between the color signals RGB and Lab is described and which is stored in the storage unit 203 or the like.

The defined standard conversion method is also used to convert the gloss signal Gl into the gloss signal g and convert the gloss signal Sp into the gloss signal s. Alternatively, an interpolation operation of referring to a gloss table in which the correspondence between the gloss signals Gl and g and the correspondence between the gloss signals Sp and s are described and which is stored in the storage unit 203 or the like is used to perform conversion.

When the color table or gloss table is used, the color table or gloss table is preferably prepared for each type of appearance data or each appearance capturing device which has generated appearance data, and a table to be used for conversion is selected based on, for example, identification information described in the header of appearance data. A table to be used for conversion may be selected based on a user instruction, as a matter of course.

An appearance mapping unit 1103 performs color mapping and gloss mapping by referring to the reproducible range information of the appearance reproduction apparatus 209 stored in the storage unit 203 or the like. Based on the color reproducible range indicated by the reproducible range information, a color mapping unit 1111 converts the color signals Lab into color signals L'a'b' corresponding to a color reproducible by the appearance reproduction apparatus 209. A gloss reproducible range obtaining unit 1112 obtains the gloss reproducible range of the appearance reproduction apparatus 209 within which the color signals L'a'b' after color mapping can be maintained, by referring to the reproducible range information. A gloss mapping unit 1113 converts the gloss signals gs into gloss signals g's' within the gloss reproducible range.

A signal converter 1104 converts the appearance signals L'a'b'g's' into recording material amount signals (color material amount signals CMYK and gloss adjustment material amount signals AB) corresponding to the amounts of the recording materials of the appearance reproduction apparatus 209 and a recording method signal (to be referred to as a "path count signal P" hereinafter) indicating a recording method for the appearance reproduction apparatus 209. Conversion by the signal converter 1104 is performed by referring to the device characteristic table of the appearance reproduction apparatus 209 stored in the storage unit 203 or the like.

FIG. 8 shows an example the device characteristic table of the appearance reproduction apparatus 209. In the device characteristic table, the appearance signals Labgs corresponding to the discrete recording material amount signals CMYKAB and path count signal P are described. The color material amount signals CMYK are signals associated with color material amounts, each of which is an 8-bit digital signal for a corresponding color. The gloss adjustment material amount signals AB are associated with the amounts of gloss adjustment materials A and B, respectively, and each signal is, for example, an 8-bit digital signal. The path count signal P is a signal associated with a recording path count n. The path count signal P takes, for example, a value between 1 and 16. The path count signal P=1 indicates 1-path recording, the path count signal P=2 indicates 2-path recording, . . . , the path count signal P=16 indicates 16-path recording.

A halftone processor 1105 performs halftone processing for the recording material amount signals CMYKAB output from the signal converter 1104 by an error diffusion method or ordered dither method, thereby outputting binary signals C'M'Y'K'A'B' corresponding to the resolution of the appearance reproduction apparatus 209. The binary signals C'M'Y'K'A'B' indicate recording or non-recording of dots of the color materials and gloss adjustment materials, that is, the recording positions of dots of the color materials and gloss adjustment materials. For example, a dot is recorded at a position with a signal value "1", and is not recorded at a position with a signal value "0".

Based on the path count signal P and the binary signals C'M'Y'K'A'B' after the halftone processing which indicate the dot placement of the color materials and gloss adjustment materials, an output signal generator 1106 performs path-separation processing to generate output signals to be output to the appearance reproduction apparatus 209. By performing the path-separation processing, the logical products of the path mask and the binary signals C'M'Y'K'A'B' are calculated, and dot placement signals C"M"Y"K"A"B" indicating the dot placement of the recording materials to be recorded in each path are generated as output signals.

There are 16 sets of path masks for 1-path recording to 16-path recording, and the output signal generator 1106 selectively uses a path mask set corresponding to the path count signal P. For example, as for the path count signal P=2, the dot placement of a cyan color material of the first path is generated by the logical product of the path mask for the first path of the path mask set for 2-path recording and the binary signal C' indicating the dot recording position of the cyan color material.

FIG. 9 shows examples of the path masks. In FIG. 9, each example of a path mask of 4×4 cells (an example of up to 4-path recording in which the number of nozzles of the printhead for each recording material is 4) for the sake of simplicity. When performing 1-path recording to 16-path recording, the number of nozzles for each recording material is at least 16, and a path mask of 16×16 cells is used.

In FIG. 9, a path mask 901 is used for the first path for 1-path recording. In 1-path recording, all dots are recorded in the first path, and thus "1" is set in all the cells of the path mask.

In FIG. 9, a set of path masks 902 and 903 is used for 2-path recording. The path mask 902 is used for the first path and the path mask 903 is used for the second path. In 2-path recording, dots are separated into the first and second paths and recorded, and thus a value obtained by inverting the value of each cell of the path mask for the first path is set in a corresponding cell of the path mask for the second path.

In FIG. 9, a set of path masks 904 to 907 is used for 4-path recording. The path mask 904 is used for the first path, the path mask 905 is used for the second path, the path mask 906 is used for the third path, and the path mask 907 is used for the fourth path. In 4-path recording, since dots are separated into the first to fourth paths, and recorded, the values of the cells are set so that cells each having a value "1" do not overlap between the path masks, and are uniformly placed in each path mask.

As described above, in n-path recording, since dots are separated into the first to nth paths and recorded, the values of the cells are set so that cells each having a value "1" do not overlap between the path masks, and are uniformly placed in each path mask. Note that a different path mask may be prepared for each type of recording material.

The processes by the appearance signal obtaining unit 1102, appearance mapping unit 1103, signal converter 1104, halftone processor 1105, and output signal generator 1106 are executed for each pixel. Therefore, when the output signal generator 1106 switches a path mask set to be applied to path separation in accordance with the path count signal P for each pixel, the dot placement signals C"M"Y"K"A"B" for which the recording path count is controlled for each pixel are generated.

The output signal generator 1106 stores the dot placement signals C"M"Y"K"A"B" for each recording path in a path buffer 1107 allocated in the main memory 202 or storage unit 203. The path buffer 1107 is similar to a line buffer capable of storing data of a plurality of lines, and can store the dot placement signals C"M"Y"K"A"B" for a plurality of recording paths.

When, for example, performing 1-path recording to 16-path recording, data in a memory area corresponding to the first path of the path buffer 1107 indicate positions at which each recording material should be discharged in the first path. Similarly, data in a memory area corresponding to the second path indicate positions at which each recording material should be discharged in the second path, . . . , and data in a memory area corresponding to the 16th path indicate positions at which each recording material should be discharged in the 16th path. In other words, the logical sum of data stored in the memory area corresponding to each recording path of the path buffer 1107 indicates a position at which each recording material should be discharged in a unit recording area corresponding to the recording width L of the printhead.

A recording unit 1108 of the appearance reproduction apparatus 209 performs main scanning in the unit recording area, for example, 16 times. At this time, the dot placement signals C"M"Y"K"A"B" are sequentially output from the memory area of the path buffer 1107 corresponding to the main scanning as output signals of the image processing apparatus 1100. The recording unit 1108 drives the printhead based on the dot placement signals C"M"Y"K"A"B", thereby causing each nozzle to discharge the recording material. Upon end of recording of the unit recording area, the recording unit 1108 conveys the recording sheet 3208 by the recording width L, and performs recording for the next unit recording area. The unit recording area recording operation is repeated to generate a reproduction 1109.

Note that if the logical sum of the data stored in each memory area of the path buffer 1107 is "0", it is not necessary to discharge the recording material in the recording path corresponding to the memory area. In this case, the recording unit 1108 can advance to processing of the next recording path by skipping main scanning of the recording path. That is, even if the path count signal P is set to take a value between 1 and 16, it is not always necessary to perform main scanning 16 times for each unit recording area. In other words, main scanning of the unit recording area is repeated within a range from one to a predetermined number corresponding to the maximum value of the path count signal P.

The dot placement signals may be output in ascending order from the first path to the nth path or in descending order. Alternatively, a random output order can be adopted. Each memory area of the path buffer 1107 is cleared after the processing (it is not always necessary to move the printhead for n paths) of the recording unit 1108 associated with main scanning for n-path recording ends. The memory area may be cleared at the end of the processing (it is not always necessary to move the printhead in the recording path) of the recording unit 1108 associated with main scanning for the recording path corresponding to the memory area.

As described above, after performing color mapping for the color signals of the appearance signals to the color reproducible range of the appearance reproduction apparatus 209, gloss mapping is performed for gloss signals of the appearance signals to a gloss reproducible range within which a color after color mapping can be maintained. In other words, a color to be reproduced is determined based on the color reproducible range of the appearance reproduction apparatus, and then gloss to be reproduced is determined based on the gloss reproducible range reproducible by the appearance reproduction apparatus while maintaining the color. Furthermore, imaging clarity is controlled for each pixel by controlling the recording path count n for each pixel, thereby generating the reproduction 1109 in which the appearance of the object indicated by the appearance data is preferably reproduced.

Therefore, even if the appearance of the object falls outside the appearance reproducible range of the appearance reproduction apparatus 209 and the gloss reproducible range of the appearance reproduction apparatus 209 changes depending on a color, it is possible to generate the reproduction 1109 in which the appearance of the object indicated by the appearance data is preferably reproduced. Especially when reproducing a picture, a difference in color between the object and the reproduction largely influences a difference in appearance. According to the first embodiment which prioritizes maintaining of the color, however, it is possible to satisfactorily reproduce the color of the object.

Furthermore, in the appearance reproduction procedure shown in FIG. 1, the processing in step S101 is performed by the data input unit 1101, the processing in step S102 is performed by the appearance signal obtaining unit 1102, and the processing in step S103 is performed by the appearance mapping unit 1103. In addition, the processing in step S104 is performed by the color mapping unit 1111, the processing in step S105 is performed by the gloss reproducible range obtaining unit 1112, and the processing in step S106 is performed by the gloss mapping unit 1113. Similarly, the processing in step S107 is performed by the signal converter 1104, halftone processor 1105, and output signal generator 1106 of a signal generation unit 1110, and the processing in step S108 is performed by the recording unit 1108.

Modification of First Embodiment

Gloss mapping emphasizing specular glossiness and gloss mapping emphasizing imaging clarity have been explained above. Whether to emphasize specular glossiness or imaging clarity may be switched in accordance with a user instruction, appearance data, or an area of an image. Alternatively, whether to emphasize specular glossiness or imaging clarity may be switched in accordance with a color reproduction error in color mapping.

Second Embodiment

An image processing apparatus, an image processing method, and an appearance reproduction apparatus according to the second embodiment of the present invention will be described below. Note that in the second embodiment, the same reference numerals as those in the first embodiment denote the same components and a detailed description thereof may be omitted.

In the second embodiment, an example in which a gloss signal is corrected based on a color mapping result, and gloss mapping is performed for the corrected gloss signal will be described. FIG. 10 is a flowchart for explaining the procedure of appearance reproduction processing according to the second embodiment.

When a color signal after color mapping is generated and a color reproducible range is obtained by the same processes (S101 to S105) as in the first embodiment, a color reproduction error is calculated from color signals before and after color mapping (S111). As the color reproduction error, for example, a difference ΔL of luminance between the color signals is calculated.

Next, the gloss signal of appearance signals is corrected in accordance with the color reproduction error (S112). This correction processing is performed to compensate the color reproduction error by gloss, in which, for example, the gloss signal corresponding to specular glossiness is corrected in accordance with the calculated difference ΔL of luminance. The corrected gloss signal is converted into a gloss signal corresponding to gloss within the gloss reproducible range (S106). Subsequent processes are the same as in the first embodiment and a detailed description thereof will be omitted.

In general, as specular glossiness is higher, a reproduction is observed more brightly.

For example, if a color darker than that to be originally reproduced is reproduced since the luminance indicated by input appearance data is higher than that reproducible by the appearance reproduction apparatus, the gloss signal is corrected to obtain a reproduction with higher specular glossiness. To the contrary, if a color brighter than that to be originally reproduced is reproduced since the luminance indicated by the appearance data is lower than that reproducible by the appearance reproduction apparatus, the gloss signal is corrected to obtain a reproduction with lower specular glossiness.

Note that the above procedure is merely an example. For example, reproducible range information may be obtained before the appearance data is input, or calculation of a color reproduction error and correction of the gloss signal may be performed before the gloss reproducible range is obtained.

Processing Arrangement in Appearance Reproduction System

FIG. 11 is a block diagram for explaining a processing arrangement in an appearance reproduction system according to the second embodiment. A processing arrangement and functions shown in FIG. 11 are implemented by the operation of an image processing apparatus 1100 implemented when a CPU 201 executes the program for the image processing (S101 to S107) shown in FIG. 10 and the operation of an appearance reproduction apparatus 209 based on an instruction of the CPU 201.

In the image processing apparatus 1100 according to the second embodiment, the arrangement of an appearance mapping unit 1103 is different from that shown in FIG. 7 in the first embodiment, and other components are the same as in the first embodiment and a detailed description thereof will be omitted. The appearance mapping unit 1103 includes a color reproduction error calculation unit 1114 and a gloss signal correction unit 1115 in addition to a color mapping unit 1111, a gloss reproducible range obtaining unit 1112, and a gloss mapping unit 1113 which are the same as in the first embodiment.

The color reproduction error calculation unit 1114 executes the processing in step S111 of calculating a color reproduction error from color signals before and after color mapping. The gloss signal correction unit 1115 executes the processing in step S112 of correcting the gloss signal of the appearance signals in accordance with the color reproduction error. Correction of a gloss signal g corresponding to specular glossiness is performed by:

$$\Delta L = L - L';$$
$$g'' = g + \alpha \times \Delta L; \quad (1)$$

where L represents a luminance value before mapping, L' represents a luminance value after mapping, α represents a predetermined constant, and g" represents a corrected gloss signal.

The gloss mapping unit 1113 executes the processing in step S106 of converting the gloss signals g"s into gloss signals g's' within the gloss reproducible range. That is, the corrected gloss signal g" and the gloss signal s output from the appearance signal obtaining unit 1102 are converted into the gloss signals g's' within the gloss reproducible range.

As described above, since the gloss signal is corrected based on a color reproduction error as a color mapping result, and gloss mapping is performed for the corrected gloss signal, the difference in overall appearance between the object and the reproduction can be decreased.

Modification of Second Embodiment

An example in which the gloss signal g is corrected based on the difference ΔL of luminance has been explained above. However, the gloss signal g may be corrected based on a difference ΔC=C−C' of chroma as a difference between a chroma value C before mapping and a chroma value C' after mapping. In general, as specular glossiness is higher, more illumination light enters an eye as a bias and thus the user feels that the chroma of the reproduction is lower. Therefore, if a color dimmer than that to be originally reproduced is reproduced since a chroma indicated by input appearance data is higher than that reproducible by the appearance reproduction apparatus, the gloss signal g is corrected so as to obtain a reproduction with lower specular glossiness.

Similarly, the gloss signal g may be corrected based on a difference Δh of hue. In this case, the gloss signal g corresponding to specular glossiness contains color information in addition to brightness information. Then, the difference of hue between colors before and after color mapping is compensated by the difference of hue of gloss. For example, if the red hue indicated by the input appearance data is stronger than that reproducible by the appearance reproduction apparatus, the gloss signal g is corrected to more largely reproduce red of regular reflected light. Similarly, if the yellow hue indicated by the appearance data is stronger than that reproducible by the appearance reproduction apparatus, the gloss signal g is corrected to more largely reproduce yellow of regular reflected light.

Furthermore, an arrangement of applying correction of the gloss signal g to only a specific color can be adopted. In this case, for example, an area extraction unit for extracting a gold area or metal color area is added. Only if a chroma reproducible by the appearance reproduction apparatus is lower than that indicated by the appearance data input in the extracted area, the gloss signal g of the area is corrected to reproduce higher specular glossiness.

Third Embodiment

An image processing apparatus, an image processing method, and an appearance reproduction apparatus according to the third embodiment of the present invention will be described below. Note that in the third embodiment, the same reference numerals as those in the first and second embodiments denote the same components and a detailed description thereof may be omitted.

In the third embodiment, an example in which appearance data is directly converted into control signals of an appearance reproduction apparatus 209 will be described. FIG. 12 is a block diagram for explaining a processing arrangement in an appearance reproduction system according to the third embodiment. A processing arrangement and functions shown in FIG. 12 are implemented by the operation of an image processing apparatus 1100 implemented when a CPU 201 executes a program for image processing of converting appearance data into control signals and the operation of the appearance reproduction apparatus 209 based on an instruction of the CPU 201.

Similarly to the first embodiment, a data input unit 1101 inputs appearance data RGBGlSp formed by appearance signals from a storage unit 203, a recording medium 208, a server apparatus (not shown), or the like. A signal converter 1201 converts the appearance data RGBGlSp into recording material amount signals (color material amount signals CMYK and gloss adjustment material amount signals AB) corresponding to the amounts of recording materials of the appearance reproduction apparatus 209, and a recording method signal (path count signal P) indicating a recording method for the appearance reproduction apparatus 209. Processing arrangement after the signal converter 1201 is the same as that shown in FIG. 7 in the first embodiment and a description thereof will be omitted.

Conversion by the signal converter 1201 is performed by referring to an appearance reproduction table of the appearance reproduction apparatus 209 stored in the storage unit 203 or the like. FIG. 13 shows an example of the appearance reproduction table. In the appearance reproduction table, control signals CMYKABP corresponding to the discrete appearance signals RGBGlSp are described.

The appearance reproduction table is created using an appearance signal obtaining unit 1102, an appearance mapping unit 1103, and a signal converter 1104 which have been described in the first embodiment. That is, the appearance signal obtaining unit 1102 converts the discrete appearance signals RGBGlSp described in the appearance reproduction table into device independent appearance signals Labgs. The appearance mapping unit 1103 converts the appearance signals Labgs into appearance signals L'a'b'g's' corresponding to an appearance reproducible by the appearance reproduction apparatus 209. The signal converter 1104 converts the appearance signals L'a'b'g's' into the control signals CMYKABP of the appearance reproduction apparatus 209, and stores a conversion result in association with the appearance signals RGBGlSp in the appearance reproduction table.

Verification of Appearance Reproduction Table

A signal generation unit 1110 according to the third embodiment performs steps S102 to S107 of an appearance reproduction procedure shown in FIG. 1 by referring to the appearance reproduction table. Therefore, obtaining a reproduction 1109 in which the appearance of an object is appropriately reproduced assumes that an appropriate appearance reproduction table has been created. A method of verifying whether the appearance reproduction table is appropriate will be described below.

A plurality of sets of appearance signals with the same specular glossiness and different colors are prepared as sets of verification appearance signals RGBGlSp. Note that colors reproducible by the appearance reproduction apparatus 209 are set as the colors of the appearance signals. As specular glossiness, specular glossiness unreproducible by the appearance reproduction apparatus 209 is set when it is combined with some of the set colors, and specular glossiness reproducible by the appearance reproduction apparatus 209 is set when it is combined with other colors.

Conditions of verification appearance signals will be described with reference to FIG. 14. FIG. 14 shows an example in which five colors reproducible by the appearance reproduction apparatus 209 and three specular glossinesses reproducible by the appearance reproduction apparatus 209 are combined. FIG. 14 shows whether specular glossiness is reproducible for each combination.

As shown in FIG. 14, with respect to the fifth color, any specular glossiness cannot be reproduced and the conditions of the verification appearance signals are not satisfied. On the other hand, with respect to the first and second colors, the first and second specular glossinesses can be reproduced. With respect to the third and fourth colors, the second specular glossiness can be reproduced.

On the other hand, in terms of the specular glossiness, the second specular glossiness can be reproduced when it is combined with one of the first to fourth colors. The third specular glossiness cannot be reproduced even when it is combined with any color. Therefore, combinations satisfying the conditions of the verification appearance signals are combinations of the second specular glossiness and the first to fourth colors.

For each set of appearance signals satisfying the conditions of the verification appearance signals, patch data for forming a patch of a measurable size is prepared. A group of patch data is input to the appearance reproduction system shown in FIG. 12, and the specular glossiness of the patch is measured.

If the appearance reproduction table has been appropriately set, color mapping is performed before gloss mapping, and thus the patch of the appearance data for which the color and the specular glossiness cannot be reproduced at the same time is reproduced at specular glossiness different from that indicated by the appearance data. For example, the patches of the appearance data corresponding to the third and fourth colors shown in FIG. 14 are reproduced at specular glossiness different from the first specular glossiness.

On the other hand, the patch of the appearance data for which the color and the specular glossiness can be reproduced at the same time is reproduced at specular glossiness indicated by the appearance data. For example, the patches of the appearance data corresponding to the first and second colors shown in FIG. 14 are reproduced at the first specular glossiness.

That is, the specular glossinesses indicated by the respective appearance data equal to each other. However, the specular glossinesses of the patches formed by the appearance data are not equal to each other, and there are variations between the specular glossinesses of the patches. Therefore, if the standard deviation of the specular glossinesses of the patches is larger than that (to be referred to as a "specific deviation" hereinafter) of the specular glossiness specific to the appearance reproduction apparatus 209 (to be described later), it can be determined that the appearance reproduction table has been appropriately set. To the contrary, if the standard deviation of the specular glossinesses of the patches is almost equal to the specific deviation, it can be determined that the appearance reproduction table has not been appropriately set. As the specific deviation, the standard deviation of specular glossinesses measured from patches obtained by repeating, by the appearance reproduction apparatus 209, formation of a patch of the same specular glossiness as that of the verification appearance signals a plurality of times is used.

If a set of appearance data with the same gloss signals and different color signals is a verification data group, verification appearance signals are a subset of the verification data group. In other words, the signal converter 1201 generates the following control signals in at least one of the subset of the verification data group. That is, the signal converter 1201 generates control signals with which the standard deviation of the specular glossiness of the reproduction 1109 when the appearance data included in the subset is input is larger than the specific deviation of the appearance reproduction apparatus 209. In other words, the appearance reproduction table has a characteristic in which the standard deviation of the specular glossiness of the reproduction 1109 formed by the appearance reproduction apparatus 209 using output signals generated from the appearance data included in the subset is made larger than the specific deviation of the appearance reproduction apparatus 209.

As described above, it is possible to implement the plurality of processes in the first embodiment by performing one conversion process with reference to the appearance reproduction table in which the correspondence between the discrete appearance signals RGBGlSp and the control signals CMYKABP of the appearance reproduction apparatus 209 is described. In other words, the processes by the appearance signal obtaining unit 1102, color mapping unit 1111, gloss reproducible range obtaining unit 1112, gloss mapping unit 1113, and signal converter 1104 in the first embodiment can be implemented by one conversion process, thereby allowing high-speed appearance reproduction processing.

Fourth Embodiment

An image processing apparatus, an image processing method, and an appearance reproduction apparatus according to the fourth embodiment of the present invention will be described below. Note that in the fourth embodiment, the same reference numerals as those in the first to third embodiments denote the same components and a detailed description thereof may be omitted.

Appearance Reproduction Processing

FIG. 15 is a flowchart for explaining appearance reproduction processing according to the fourth embodiment. The appearance data of an object is input (S1001). Note that if the appearance of the object is different depending on an area, appearance data corresponding to appearance signals for each area is input.

Appearance signals (color signals and gloss signals) are obtained from the input appearance data (S1002), and information indicating the appearance reproducible range of the appearance reproduction apparatus is obtained (S1003). The appearance reproducible range of the appearance reproduction apparatus is stored in advance in a storage device as reproducible range information.

An appearance mapping method selected by the user is obtained (S1004). There are a mapping method emphasizing specular glossiness, a mapping method emphasizing imaging clarity, and the like as appearance mapping methods, and the user selects a desired one of the mapping methods.

In accordance with the appearance mapping method obtained in step S1004, based on the appearance reproducible range indicated by the reproducible range information, the appearance signals obtained in step S1002 are converted into those corresponding to an appearance reproducible by the appearance reproduction apparatus (S1005).

Conversion in step S1005 is "appearance mapping", and a detailed description thereof will be given later.

Output signals to be output to the appearance reproduction apparatus are generated based on the appearance signals after appearance mapping (S1006). The appearance reproduction apparatus is, for example, an image recording apparatus such as a printer, and the output signals are, for example, signals associated with the amounts of recording materials held by the image recording apparatus. A detailed description thereof will be given later.

The appearance reproduction apparatus generates a reproduction based on the output signals (S1007). Similarly to the first embodiment and the like, with respect to the "appearance data" formed from the appearance signals, data formed from the output signals will be referred to as "control data" hereinafter. In other words, step S1005 is a step of converting the input appearance data into that corresponding to an appearance reproducible by the appearance reproduction apparatus. Step S1006 is a step of converting the appearance data obtained in step S1005 into control data of the appearance reproduction apparatus.

Note that the above procedure is merely an example. For example, before the input of the appearance data, the reproducible range information and the appearance mapping method may be obtained.

Appearance Mapping

In appearance mapping (S1005), it is determined whether the appearance signals obtained in step S1002 fall within the appearance reproducible range. In other words, it is determined whether the appearance signals obtained in step S1002 are appearance signals reproducible by the appearance reproduction apparatus (S1051). That is, if a combination of CIELAB values, a specular glossiness value, and an imaging clarity value in the appearance signals falls within the appearance reproducible range, it is determined that the obtained appearance signals are appearance signals reproducible by the appearance reproduction apparatus, and the appearance signals are directly output as those after appearance mapping (S1052).

On the other hand, if it is determined that the obtained appearance signals are appearance signals unreproducible by the appearance reproduction apparatus, the color signals of the appearance signals are converted, based on the color reproducible range indicated by the reproducible range information, into color signals corresponding to a color reproducible by the appearance reproduction apparatus (S1053). Conversion in step S1053 is "color mapping". Color mapping is performed by a known method, as described in the first embodiment.

Based on a gloss reproducible range indicated by the reproducible range information, the gloss signals of the appearance signals are converted into those corresponding to gloss reproducible by the appearance reproduction apparatus, and output as appearance signals after appearance mapping (S1054). Conversion in step S1054 is "gloss mapping".

Gloss Mapping

Gloss mapping according to the fourth embodiment will be described with reference to FIG. 2. For example, if an appearance mapping method emphasizing specular glossiness is set, a gloss signal 22 is mapped to a point 23, and a gloss signal close to the specular glossiness of the input appearance data is output. As a result, a reproduction with a small difference with respect to the specular glossiness indicated by the input appearance data is obtained.

On the other hand, if an appearance mapping method emphasizing imaging clarity is set, the gloss signal 22 is mapped to a point 24, and a gloss signal close to the imaging clarity of the input appearance data is output. As a result, a reproduction with a small difference with respect to the imaging clarity indicated by the input appearance data is obtained.

The user can change the gloss mapping method in accordance with their preference or an application purpose. For example, if a large number of high frequency components are in the distribution of gloss signals corresponding to imaging clarities, it is possible to select an appearance mapping method emphasizing specular glossiness in consideration of the fact that a difference in specular glossiness has a larger influence on a difference in appearance than a difference in imaging clarity.

Processing Arrangement in Appearance Reproduction System

FIG. 16 is a block diagram for explaining an example of a processing arrangement in an appearance reproduction system according to the fourth embodiment. A processing arrangement and functions shown in FIG. 16 are implemented by the operation of an image processing apparatus 1100 implemented when a CPU 201 executes the program for the above-described image processing (S101 to S106) and the operation of an appearance reproduction apparatus 209 based on an instruction of the CPU 201. A data input unit 1101, an appearance signal obtaining unit 1102, an appearance mapping unit 1103, a signal generation unit 1110, a path buffer 1107, and the appearance reproduction apparatus 209 have the same arrangements as in the first embodiment and a detailed description thereof will be omitted.

A mapping method obtaining unit 1301 obtains an appearance mapping method through, for example, a UI. There are a method emphasizing specular glossiness, a method emphasizing imaging clarity, and the like as appearance mapping methods. The appearance mapping unit 1103 generates appearance signals L'a'b'g's' by mapping appearance signals Labgs to the appearance reproducible range by the above-described color mapping and gloss mapping according to the appearance mapping method. Note that the appearance mapping unit 1103 refers to the reproducible range information of the appearance reproduction apparatus 209 stored in the storage unit 203 or the like, similar to the first embodiment.

In the appearance reproduction system according to the fourth embodiment, it is possible to generate a reproduction 1109 in which the appearance of the object indicated by the appearance data is preferably reproduced, by controlling imaging clarity for each pixel by appearance mapping and control of a recording path count n for each pixel when the appearance signals fall outside the appearance reproducible range of the appearance reproduction apparatus 209. Furthermore, an appearance mapping method can be designated by the user, and appearance reproduction emphasizing reproduction of specular glossiness or appearance reproduction emphasizing imaging clarity becomes possible in accordance with a request for the reproduction 1109 or the application purpose of the reproduction 1109.

In the appearance reproduction procedure shown in FIG. 15, the processing in step S1001 is performed by the data input unit 1101, the processing in step S1002 is performed by the appearance signal obtaining unit 1102, the processes in steps S1003 and S1005 are performed by the appearance mapping unit 1103, and the processing in step S1004 is performed by the mapping method obtaining unit 1301. Similarly, the processing in step S1006 is performed by a signal converter 1104, a halftone processor 1105, and an output signal generator 1106 of a signal generation unit 1110. The processing in step S1007 is performed by a recording unit 1108.

Furthermore, FIG. 16 shows an example in which the data input unit 1101 to the output signal generator 1106 of the image processing apparatus 1100 are implemented by an information processing apparatus shown in FIG. 3 for executing the image processing shown in FIG. 15. However, these processors can be incorporated in the appearance reproduction apparatus 209.

Fifth Embodiment

An image processing apparatus, an image processing method, and an appearance reproduction apparatus according to the fifth embodiment of the present invention will be described below. Note that in the fifth embodiment, the same reference numerals as those in the first to fourth embodiments denote the same components and a detailed description thereof may be omitted.

In the fourth embodiment, an example in which two mapping methods respectively emphasizing specular glossiness and imaging clarity are adopted as appearance mapping methods. In the fifth embodiment, an example in which a mapping method emphasizing specular glossiness uniformity and a mapping method emphasizing imaging clarity uniformity are further adopted will be described. That is, in the fifth embodiment, a mapping method obtaining unit 1301 allows the user to designate a mapping method emphasizing specular glossiness, imaging clarity, specular glossiness uniformity, or imaging clarity uniformity.

The appearance mapping method emphasizing specular glossiness uniformity will be exemplified below, and the same applies to the appearance mapping method emphasizing imaging clarity uniformity. Furthermore, if it is not necessary to discriminate between specular glossiness and imaging clarity, specular glossiness and imaging clarity may be collectively referred to as "glossiness" hereinafter.

Reason that Uniform Glossiness is Necessary

An example in which uniform glossiness is necessary will be described with reference to FIGS. 17A to 17D. FIG. 17A shows an example of the distribution of gloss signals g, in which the gloss signals g of constant large values are input at all pixel positions. FIG. 17B shows an example of a glossiness reproducible range (to be referred to as a "gloss reproducible range" hereinafter), in which a gloss reproducible range at each pixel position is indicated by a broken bar.

As shown in FIG. 17B, the gloss reproducible range is different depending on a pixel due to the influence of the color signals of the pixel. That is, since the color material amounts CMYK necessary to reproduce a color expressed by given color signals are different, the three-dimensional structure, thickness, refractive index distribution, and the like of a color material layer formed on a recording medium are different, thereby influencing the gloss reproducible range.

It is possible to obtain the gloss reproducible range by referring to a device characteristic table shown in FIG. 8. For example, Labg values surrounding Lab of appearance signals Labgs of interest are obtained from the device characteristic table, and the gloss reproducible range is defined by the maximum g value and the minimum g value included in the Labg values.

It is possible to adjust glossiness using gloss adjustment materials A and B with different refractive indices. Since, however, the amounts of recording materials which can be penetrated into or fixed to a recording medium are limited, the amounts of gloss adjustment materials are restricted in accordance with the color material amounts, and it may be difficult to use necessary amounts of gloss adjustment materials to achieve desired glossiness. Furthermore, if the three-dimensional structure of the color material layer is large, it may be impossible to sufficiently smooth the color material layer by even using the gloss adjustment materials. Therefore, it is impossible to obtain arbitrary glossinesses for all colors, and the gloss reproducible range changes depending on color signals.

FIG. 17C shows the result of simply mapping the gloss signal g shown in FIG. 17A to the gloss reproducible range shown in FIG. 17B. Note that in the example shown in FIG. 17C, a mapping method of minimizing an error before and after mapping in each pixel is used. As shown in FIG. 17C, the distribution of the gloss signals g after mapping is not uniform, thereby causing a difference in gloss between the pixels. In the example of FIG. 17C, a change in gloss which does not exist in the input signal occurs, and insufficient reproduction of an appearance tends to be evaluated especially in photolithography requiring glossiness uniformity. Therefore, when glossiness uniformity is required, a mapping result shown in FIG. 17D is desirably obtained.

Appearance Mapping Emphasizing Gloss Uniformity

FIG. 18 is a flowchart for explaining appearance mapping emphasizing gloss uniformity. Processing shown in FIG. 18 corresponds to the internal processing of appearance mapping (S1005) shown in FIG. 15.

First, an average value ga of glossinesses is obtained from gloss signals g near a pixel of interest (S301). The neighboring area of the pixel of interest is a rectangular range of a predetermined size including the pixel of interest but the size and shape of the neighboring area are arbitrary, and the neighboring area may be the entire image.

Next, a common gloss reproducible range near the pixel of interest is obtained (S302). The common gloss reproducible range corresponds to a narrowest gloss reproducible range in the neighboring area. That is, if color signals are different for each pixel, the gloss reproducible range is different for each pixel. The maximum value of the gloss reproducible ranges of the respective pixels of the neighboring area is obtained, and the minimum value of the set of maximum values is set as an upper limit value UL of the common gloss reproducible range. Similarly, the minimum value of the gloss reproducible ranges of the respective pixels of the neighboring area is obtained, and the maximum value of the set of the minimum values is set as a lower limit value LL of the common gloss reproducible range.

As an example requiring exception processing, a case in which there is no range common to the gloss reproducible ranges of the pixels of the neighboring area will be described. In this case, if the common gloss reproducible range is obtained, the upper limit value UL of the common gloss reproducible range is smaller than the lower limit value LL of the common gloss reproducible range. It is determined, based on the relationship between the upper limit value UL and the lower limit value LL, whether an exception has occurred (S303). If exception processing is not necessary (UL≥LL), the process advances to step S304; otherwise (UL<LL), the exception processing (S309) (to be described later) is executed.

If the exception processing is not necessary, it is determined whether the glossiness average value ga obtained in step S301 falls within the common gloss reproducible range (S304). If the glossiness average value ga falls within the common gloss reproducible range (LL≤ga≤UL), a gloss signal g' obtained by mapping the gloss signal g of the pixel of interest to the glossiness average value ga is output (S305).

If the glossiness average value ga falls outside the common gloss reproducible range, the glossiness average value ga is compared with the upper limit value UL of the common gloss reproducible range (S306). If the average value is equal to or larger than the upper limit value (ga≥UL), a gloss signal g' obtained by mapping the gloss signal g of the pixel of interest to the upper limit value UL is output (S307). On the other hand, if the average value is smaller than the upper limit value (ga<UL), a gloss signal g' obtained by mapping the gloss signal g of the pixel of interest to the lower limit value LL is output (S308).

Exception Processing

FIG. 19 is a flowchart for explaining the exception processing (S309). First, the gloss signals g' obtained by mapping the gloss signals of the pixels of the neighboring area to the upper limit value UL of the common gloss reproducible range are generated, and the sample standard deviation of the gloss signals g' is calculated as a first uniformity evaluation value E1 (S501). In addition, the gloss signals g' obtained by mapping the gloss signals g of the pixel of the neighboring area to the lower limit value LL of the common gloss reproducible range are generated, and the sample standard deviation of the gloss signals g' is calculated as a second uniformity evaluation value E2 (S502).

The first and second uniformity evaluation values are compared (S503). If the first uniformity evaluation value is smaller than the second uniformity evaluation value (E1<E2), the gloss signal g' obtained by mapping the gloss signal g of the pixel of interest to the upper limit value UL is output (S504). If the first uniformity evaluation value is equal to or larger than the second uniformity evaluation value (E1≥E2), the gloss signal g' obtained by mapping the gloss signal g of the pixel of interest to the lower limit value LL is output (S505).

As described above, it becomes possible to perform gloss mapping emphasizing glossiness uniformity, thereby generating a reproduction preferable for a case requiring glossiness uniformity.

Glossiness uniformity achieved by the fifth embodiment has a characteristic in which even if input gloss signals are the same, they are mapped to different glossinesses in accordance with input color signals. This is because the gloss reproducible range is different depending on color signals, and the upper limit value UL and lower limit value LL of the common gloss reproducible range also change depending on the color signals.

A conventional technique of achieving gloss uniformity generates control signals so that the glossiness becomes close to predetermined design glossiness regardless of an image. Therefore, it may be impossible to make the glossiness sufficiently close to the design glossiness depending on color signals, resulting in insufficient gloss uniformity. More specifically, a method of making the glossiness close to the design glossiness regardless of an image is equivalent to making the glossiness close to that of the common gloss reproducible range in all color signals reproducible by the appearance reproduction apparatus. Many appearance reproduction apparatuses may not have a common gloss reproducible range, and thus select, as design glossiness, glossiness which provides the best uniformity evaluation value. This is equivalent to processing of performing in advance the exception processing for all the color signals according to the fifth embodiment, and determining design glossiness.

On the other hand, in the fifth embodiment, a common gloss reproducible range is obtained in accordance with an image, and control signals are generated so as to make glossiness close to that of a gloss reproducible range in a predetermined area. Consequently, the problem that there is no common gloss reproducible range is relatively difficult to arise, and it is easier to equalize glossinesses than the conventional technique, thereby reproducing gloss with higher uniformity.

Sixth Embodiment

An image processing apparatus, an image processing method, and an appearance reproduction apparatus according to the sixth embodiment of the present invention will be described below. Note that in the sixth embodiment, the same reference numerals as those in the first to fifth embodiments denote the same components and a detailed description thereof may be omitted.

In the sixth embodiment, an example in which a mapping method emphasizing the tonality of specular glossiness or imaging clarity is further adopted as an appearance mapping method will be described. That is, in the sixth embodiment, a mapping method obtaining unit 1301 allows the user to designate a mapping method emphasizing specular glossiness, imaging clarity, specular glossiness uniformity, imaging clarity uniformity, or the tonality of specular glossiness or imaging clarity.

The appearance mapping method emphasizing the tonality of specular glossiness will be exemplified below, and the same applies to the appearance mapping method emphasizing the tonality of imaging clarity. Furthermore, similarly to the fifth embodiment, if it is not necessary to discriminate between specular glossiness and imaging clarity, specular glossiness and imaging clarity may be collectively referred to as "glossiness" hereinafter.

Reason that Tonality of Glossiness is Necessary

An example in which the tonality of glossiness becomes necessary will be described with reference to FIGS. 20A to 20D. FIG. 20A shows an example of the distribution of gloss signals g, in which gloss signals g of large values are input at some pixel positions and gloss signals g of small values are input at other pixel positions. In FIG. 20B, an example of a gloss reproducible range at each pixel position is indicated by a broken bar, similarly to FIG. 17B.

FIG. 20C shows the result of simply mapping the gloss signal g shown in FIG. 20A to the gloss reproducible range shown in FIG. 20B. Note that in the example shown in FIG. 20C, the appearance mapping method emphasizing gloss uniformity, which has been explained in the fifth embodiment, is used. As a result, as shown in FIG. 20C, the distribution of the gloss signals g after mapping becomes uniform, and the gloss difference between the input gloss signals g disappears. In other words, the tonality of glossiness is lost. The disappearance of the gloss difference tends to lead to evaluation of insufficient reproduction of an appearance especially in image printing intended to obtain a decorative effect by gloss. Therefore, when the tonality of glossiness is required, a mapping result shown in FIG. 20D is desirably obtained.

Appearance Mapping Emphasizing Tonality of Glossiness

FIG. 21 is a flowchart for explaining appearance mapping emphasizing the tonality of glossiness. Processing shown in FIG. 21 corresponds to the internal processing of appearance mapping (S1005) shown in FIG. 15.

The difference between the maximum and minimum values of the gloss signals g near a pixel of interest is obtained as a gloss difference gd (S401). The neighboring area of the pixel of interest is a rectangular range of a predetermined size including the pixel of interest but the size and shape of the neighboring area are arbitrary, and the neighboring area may be the entire image.

Next, a reproduced gloss difference gdr representing the difference between reproduced gloss values near the pixel of interest is obtained (S402). The reproduced gloss difference gdr corresponds to a widest gloss reproducible range in the neighboring area. That is, the maximum value of the gloss reproducible ranges of the respective pixels of the neighboring area is obtained, and the maximum value of the set of the maximum values is set as a maximum gloss value gmax. Similarly, the minimum value of the gloss reproducible ranges of the respective pixels of the neighboring area is obtained, and the minimum value of the set of the minimum values is set as a minimum gloss value gmin. A difference gmax-gmin between the maximum gloss value gmax and the minimum gloss value gmin is set as the reproduced gloss difference gdr. In other words, the reproduced gloss difference gdr is the difference between the maximum gloss value gmax and the minimum gloss value gmin which can be reproduced near the pixel of interest.

It is determined whether the reproduced gloss difference gdr is smaller than the gloss difference gd (S403). That is, the reproduced gloss difference gdr represents the maximum gloss difference reproducible in the neighboring area. If the reproduced gloss difference is smaller than the gloss difference (gdr<gd), the gloss difference gd in the neighboring area cannot be reproduced. Therefore, if gdr<gd, appearance mapping is interrupted to display, on a UI, a warning message indicating that the gloss difference cannot be reproduced (S406), and then a series of appearance reproduction processes is stopped.

Note that as for appearance data for which the frequency of occurrence of the reproduced gloss difference smaller than the gloss difference (gdr<gd) is very small, for example, appearance mapping may be continued by multiplying the gloss difference gd by a predetermined coefficient β (for example, 0.7<β<1).

If the reproduced gloss difference is equal to or larger than the gloss difference (gdr≥gd), it is determined that it is possible to reproduce the gloss difference gd in the neighboring area. In this case, gloss mapping is adjusted so that a maximum value MaxG of the gloss signals g in the neighboring area is mapped to the maximum gloss value gmax, and a minimum value MinG of the gloss signals g in the neighboring area is mapped to the minimum gloss value gmin (S404). A gloss signal g' obtained by mapping the gloss signal g of the pixel of interest is output (S405). For example, the gloss signal g of the pixel of interest is mapped by:

$$g'=(g-\text{Min}G)\times(g\text{max}-g\text{min})/(\text{Max}G-\text{Min}G)+g\text{min} \quad (2)$$

As described above, it becomes possible to perform gloss mapping emphasizing the tonality of glossiness, thereby generating a reproduction preferable for a case requiring the tonality of glossiness.

Modification of Embodiments

FIGS. 7, 11, and 12 show an example in which the data input unit 1101, appearance signal obtaining unit 1102, appearance mapping unit 1103, signal generation unit 1110, path buffer 1107, and storage unit 203 of the image processing apparatus 1100 are implemented by the information processing apparatus shown in FIG. 3 for executing the image processing shown in FIG. 1. However, these processors, path buffer, and storage unit can be incorporated in the appearance reproduction apparatus 209. The mapping method obtaining unit 1301 shown in FIG. 16 can also be incorporated in the appearance reproduction apparatus 209, as a matter of course.

The CIELAB values have been explained above as color signals. The present invention is not limited to them, and arbitrary numerical expressions and measurement conditions may be used. For example, CIEXYZ values may be used, or reflectance data for each spectral wavelength may be used. The appearance data measurement conditions are not also limited, and an incident angle and light-receiving angle which represent the positional relationship between illumination and a light-receiving sensor at the time of measurement may be arbitrarily set. A condition of integrating a plurality of light-receiving angles may be used like an integrating sphere measuring device. As for a recording medium like a film with high transparency, light obtained after incident light is transmitted through the recording medium may be received.

A gloss signal corresponding to specular glossiness is not always limited to a value measured under the conditions of the standard, and may be a value measured under other conditions or a function thereof. For example, the illumination direction of measurement may be 30 degree, and the aperture angles of illumination and received light are not limited to the conditions of the standard. A signal corresponding to specular glossiness may be a signal containing not only brightness information but also color information. As a signal containing color information, for example, CIELAB values calculated by a method stipulated in non-patent literature 1 by measuring a regular reflected light amount for each wavelength can be used. In this case, conversion of a signal corresponding to specular glossiness in gloss mapping is conversion in a three-dimensional color space. As a conversion method, a known color mapping method can be used, similarly to conversion of a color signal.

A gloss signal corresponding to imaging clarity is not always limited to a value measured under the conditions of the standard, and may be a value measured under other conditions or a function thereof. For example, an angle φ formed by a regular reflection direction and a direction in which a reflected light amount is half a regular reflected light amount near the regular reflection direction may be measured, and the inverse function of the angle may be used.

FIG. 22 shows a typical multi-angle reflected light characteristic. Referring to FIG. 22, a curve 1501 indicates a reflected light amount from point A of a sample 1502. A direction of an angle θ in which the reflected light amount is large is a regular reflection direction with respect to illumination, and the length of a line segment AB indicates a reflected light amount in the regular reflection direction.

Point C is a point at which the length of a line segment AC is half the length of the line segment AB and an angle formed by the line segments AB and AC is an angle φ. A sample with high imaging clarity has small light diffusion near the regular reflection direction and the angle φ of a small value. To the contrary, the angle φ of a sample with low imaging clarity has a large value.

Furthermore, as a gloss signal corresponding to imaging clarity, a measurement value of the three-dimensional surface structure or a function thereof may be used. An object having a smooth surface with a small three-dimensional surface structure has high imaging clarity, and an object with a large three-dimensional surface structure has low imaging clarity.

A gloss signal may contain a "maximum reflection direction" as an element associated with a direction in which the reflected light amount is largest. For some objects, the maximum reflection direction may change depending on an area. In this case, to obtain a reproduction which looks the same as an object, information about the maximum reflection direction is necessary as information held by each area in addition to specular glossiness and imaging clarity. As this information, for example, a signal corresponding to the angle θ shown in FIG. 22 or a signal corresponding to the difference between the angle θ and a reference angle can be used.

If the gloss signal contains the maximum reflection direction, information about the reflected light amount in the direction in which maximum reflected light is obtained may be used as a gloss signal corresponding to specular glossiness. In other words, a gloss signal corresponding to a direction which changes depending on an area may be used as a gloss signal corresponding to specular glossiness. Similarly, information about an angle formed by the maximum reflection direction and a direction in which the reflected light amount is half the maximum reflected light amount near the maximum reflection direction may be used as a gloss signal corresponding to imaging clarity. The maximum reflection direction can be reproduced by controlling the three-dimensional surface structure. The three-dimensional surface structure can be formed using, for example, a UV inkjet printer or 3D printer.

The halftone processing method is not limited, and a known arbitrary tone conversion method is applicable. A signal after tone conversion may be a signal of three or more levels. The method using a path mask as path-separation processing has been described. However, a path-separation processing method is not limited to this. For example, a known method of performing halftone processing for each path may be used.

Designation of an appearance mapping method is not limited to that for an entire image. For example, a different appearance mapping method may be designated or set in accordance with an image area or object. User designation or an automatic identification method based on an image feature amount is applicable to a method of extracting a specific image area or object.

The serial inkjet printer has been exemplified as an appearance reproduction apparatus. However, a full-line inkjet printer, electrophotographic printer, sublimation printer, silk printing, or the like can be used as an appearance reproduction apparatus. A UV printer for forming a surface shape or a 3D printer for forming a stereoscopic shape may be used as an appearance reproduction apparatus. The present invention is not limited to the printers, and appearance reproduction processing may be applied to an image display device such as a display or projector.

An example in which six recording materials C, M, Y, K, A, and B are used in the appearance reproduction apparatus has been described above. However, recording materials of red, white, and gold may be used and three or more types of gloss adjustment materials may be used. In an appearance reproduction apparatus other than an inkjet printer, toner, film, or the like may be used as a recording material. A head cartridge for discharging ink may be configured to discharge droplets of a plurality of sizes.

A medium other than paper such as glossy paper and plain paper may be used as a recording medium. For example, materials such as a cloth and film may be used, and a medium may include a surface with a three-dimensional structure. If a reproduction has no sheet-like shape like a stereoscopic shaped object, a mechanism for conveyance of a recording medium is provided in an appearance reproduction apparatus.

It is not essential to perform appearance reproduction processing for the entire area of an image represented by appearance data. A case in which appearance reproduction processing is not applied to a partial area and a case in which appearance reproduction processing is applied to only a partial area are included in the present invention. For example, a partial area of an image represented by appearance data may be processed to be reproduced using specific color materials without performing appearance reproduction processing.

An example in which gloss mapping is performed after performing color mapping has been explained above. These processes may be performed in the reverse order. That is, color mapping may be performed after performing gloss mapping.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-017921, 2015-017922, and 2015-017923, filed Jan. 30, 2015 which are hereby incorporated by reference herein in their entirety.

The invention claimed is:

1. An image processing apparatus for performing appearance reproduction processing to reproduce material appearance, comprising:
   one or more processors; and
   a memory coupled to the one or more processors and having stored thereon instructions which, when executed by the one or more processors, cause the image processing apparatus to:
   input appearance data including at least color information and gloss information of an object to be reproduced;
   to perform color mapping to map the color information into a color reproducible range of an appearance reproduction apparatus, based on information indicating an appearance reproducible range of the appearance reproduction apparatus;
   obtain a gloss reproducible range, in which the appearance reproduction apparatus can reproduce gloss while keeping the color information after the color mapping, based on the information indicating the appearance reproducible range;
   perform gloss mapping to map the gloss information into the gloss reproducible range; and
   generate an output signal to be outputted to the appearance reproduction apparatus, based on mapped appearance data including the color information after the color mapping and the gloss information after the gloss mapping.

2. The image processing apparatus according to claim 1, further comprising:
   a converter configured to convert the mapped appearance data into material amount signals corresponding to amounts of a plurality of recording materials of the appearance reproduction apparatus, and a recoding method signal indicating a recording method in the appearance reproduction apparatus by referring a device characteristic table of the appearance reproduction apparatus;
   a halftone processor configured to perform halftone processing on the material amount signals; and
   a generator configured to generate, as the output signal, dot placement signals indicating dot placement of the plurality of recording materials from the material amount signals after the halftone processing based on the recording method signal.

3. The image processing apparatus according to claim 2, wherein the generator performs path-separation processing on the material amount signals to generate the dot placement signals for each recording path, based on a number of recording paths indicated by the recording method signal.

4. The image processing apparatus according to claim 3, wherein the instructions, when executed by the one or more processors, further cause the image processing apparatus to store the dot placement signals of a recording path in at least one memory area of a plurality of memory areas corresponding to the recording path.

5. The image processing apparatus according to claim 4, wherein the dot replacement signals stored in the plurality of memory areas are sequentially outputted to the appearance reproduction apparatus.

6. The image processing apparatus according to claim 4, wherein the appearance reproduction apparatus repeats, in a unit recording area, main scanning to record dots of the plurality of recording materials based on the dot placement signals of each recording path in a range of predetermined number of times from one time.

7. The image processing apparatus according to claim 6, wherein the unit recording area corresponds to an area that the appearance reproduction apparatus can record by one main scanning.

8. The image processing apparatus according to claim 2, wherein the appearance reproduction apparatus has a plurality of color materials and a plurality of gloss adjustment materials as the plurality of recoding materials.

9. The image processing apparatus according to claim 2, wherein the instructions, when executed by the one or more processors, further cause the image processing apparatus to store at least the information of the appearance reproducible range and the device characteristic table.

10. The image processing apparatus according to claim 1, wherein the instructions, when executed by the one or more processors, further cause the image processing apparatus to:
    calculate a difference between the color information before the color mapping and the color information after the color mapping; and
    correct the gloss information included in the input appearance data,
    wherein the gloss mapping is performed on the corrected gloss information.

11. The image processing apparatus according to claim 10, wherein, a difference of luminance between the color information before the color mapping and the color information after the color mapping is calculated as the difference, and
    specular glossiness indicated by the gloss information based on the difference of luminance is corrected.

12. The image processing apparatus according to claim 10, wherein, a difference of chroma between the color information before the color mapping and the color information after the color mapping is calculated as the difference, and
    specular glossiness indicated by the gloss information based on the difference of chroma is corrected.

13. An image processing apparatus for performing appearance reproduction processing to reproduce material appearance, comprising:
    one or more processors; and
    a memory coupled to the one or more processors and having stored thereon instructions which, when executed by the one or more processors, cause the image processing apparatus to:
    input appearance data including at least color information and gloss information of an object to be reproduced;
    obtain a mapping method for the appearance data;
    perform appearance mapping to map the appearance data into an appearance reproducible range based on information of the appearance reproducible range of an appearance reproduction apparatus;
    generate an output signal to be outputted to the appearance reproduction apparatus based on mapped appearance data obtained by the appearance mapping,
    wherein the appearance data includes a color signal representing the color information and a gloss signal representing the gloss information, and the mapping unit performs color mapping on the color signal and performs gloss mapping according to the mapping method on the gloss signal as the appearance mapping.

14. An image processing apparatus for performing appearance reproduction processing to reproduce material appearance, comprising:
   one or more processors; and
   a memory coupled to the one or more processors and having stored thereon instructions which, when executed by the one or more processors, cause the image processing apparatus to:
   input appearance data including at least color information and gloss information of an object to be reproduced; and
   generate an output signal to be outputted to an appearance reproduction apparatus by referring an appearance reproducible table of the appearance reproduction apparatus,
   wherein, in a case when a verification data group is a set of the appearance data that the gloss information are equal and the color information are different from each other, the appearance reproducible table has characteristics that, in at least a subset of the verification data group, a standard deviation of the specular glossiness of a reproduction formed by the appearance reproduction apparatus based on the output signal generated from the appearance data included in the subset becomes larger than a standard deviation of specific specular glossiness of the appearance reproduction apparatus.

15. The image processing apparatus according to claim 13, wherein the mapping method comprises a mapping method which emphasizes specular glossiness and a mapping method which emphasizes image clarity.

16. The image processing apparatus according to claim 13, wherein the mapping method comprises a mapping method which emphasizes uniformity of specular glossiness and a mapping method which emphasizes uniformity of image clarity.

17. The image processing apparatus according to claim 16, wherein, in a case when according to the mapping method which emphasizes the uniformity of specular glossiness or image clarity, (a) an average value of gloss signals adjacent to a pixel of interest is obtained, (b) an upper limit value and a lower limit value is obtained indicating a gloss reproducible range adjacent to the pixel of interest, and (c) a gloss signal of the pixel of interest is mapped into the average value if the average value is included in the gloss reproducible range.

18. The image processing apparatus according to claim 17, wherein, in a case when the average value is not included in the gloss reproducible range, (a) the gloss signal of the pixel of interest is mapped into the upper limit value if the average value is equal to or greater than the upper limit value, and (b) the gloss signal of the pixel of interest is mapped into the lower limit value if the average value is less than the upper limit value.

19. The image processing apparatus according to claim 17, wherein, in a case when gloss reproducible ranges adjacent to the pixel of interest have no common range, (a) a first estimation value is calculated if gloss signals adjacent to the pixel of interest are mapped into the upper limit value, (b) a second estimation value is calculated if the gloss signals are mapped into the lower limit value, and (c) the gloss signal of the pixel of interest is mapped into the upper or lower limit value based on the first and second estimation values.

20. The image processing apparatus according to claim 13, wherein the mapping method comprises a mapping method which emphasizes tonality of specular glossiness and a mapping method which emphasizes tonality of image clarity.

21. The image processing apparatus according to claim 20, wherein, in a case when according to the mapping method which emphasizes the tonality of specular glossiness or image clarity, (a) a gloss difference is obtained indicating a difference between gloss signals adjacent to a pixel of interest, (b) a reproduced gloss difference is obtained indicating a difference between a maximum gloss value and a minimum gloss value which are reproducible in a neighborhood of the pixel of interest, and (c) the gloss mapping is adjusted to map a maximum value of the gloss signals into the maximum gloss value and map a minimum value of the gloss signals into the minimum gloss value if the reproduced gloss difference is equal to or greater than the gloss difference.

22. The image processing apparatus according to claim 21, wherein, in a case when the reproduced gloss difference is less than the gloss difference, a message is issued indicating that the gloss difference can not be reproduced.

23. An image processing apparatus for performing appearance reproduction processing to reproduce material appearance, comprising:
   one or more processors; and
   a memory coupled to the one or more processors and having stored thereon instructions which, when executed by the one or more processors, cause the image processing apparatus to:
   input appearance data including at least color information and gloss information of an object to be reproduced;
   perform gloss mapping to map the gloss information into a gloss reproducible range, in which an appearance reproduction apparatus can reproduce gloss, based on information indicating an appearance reproducible range of the appearance reproduction apparatus;
   obtain a color reproducible range while keeping the gloss information after the gloss mapping, based on the information indicating the appearance reproducible range;
   to perform color mapping to map the color information into the color reproducible range; and
   generate an output signal to be outputted to the appearance reproduction apparatus, based on mapped appearance data including the color information after the color mapping and the gloss information after the gloss mapping.

24. An appearance reproduction apparatus for reproducing material appearance, comprising:
   the image processing apparatus of claim 1, wherein the image processing apparatus is configured to output a control signal to reproduce material appearance of an object; and
   a recording unit configured to form a reproduction of the object using a plurality of recording materials based on the control signal.

25. An image processing method of performing appearance reproduction processing to reproduce material appearance, the method comprising:
   inputting appearance data including at least color information and gloss information of an object to be reproduced;
   performing color mapping to map the color information into a color reproducible range of an appearance reproduction apparatus, based on information indicating an appearance reproducible range of the appearance reproduction apparatus;

obtaining a gloss reproducible range, in which the appearance reproduction apparatus can reproduce gloss while keeping the color information after the color mapping, based on the information indicating the appearance reproducible range;

performing gloss mapping to map the gloss information into the gloss reproducible range; and generating an output signal to be outputted to the appearance reproduction apparatus, based on mapped appearance data indicated by the color information after the color mapping and the gloss information after the gloss mapping.

26. An image processing method of performing appearance reproduction processing to reproduce material appearance, the method comprising:

inputting appearance data including at least color information and gloss information of an object to be reproduced;

obtaining a mapping method for the appearance data;

performing appearance mapping to map the appearance data into an reproducible range based on information of the appearance reproducible range of an appearance reproduction apparatus;

generating an output signal to be outputted to the appearance reproduction apparatus based on mapped appearance data obtained by the appearance mapping, wherein the appearance data includes a color signal representing the color information and a gloss signal representing the gloss information, and the mapping unit performs color mapping on the color signal and performs gloss mapping according to the mapping method on the gloss signal as the appearance mapping.

27. An image processing method of performing appearance reproduction processing to reproduce material appearance, the method comprising:

inputting appearance data including at least color information and gloss information of an object to be reproduced; and generating an output signal to be outputted to an appearance reproduction apparatus by referring an appearance reproducible table of the appearance reproduction apparatus, wherein, in a case when a verification data group is a set of the appearance data that the gloss information are equal and the color information are different from each other, the appearance reproducible table has characteristics that, in at least a subset of the verification data group, a standard deviation of specular glossiness of a reproduction formed by the appearance reproduction apparatus based on the output signal generated from the appearance data included in the subset becomes larger than a standard deviation of specific specular glossiness of the appearance reproduction apparatus.

28. An image processing method of performing appearance reproduction processing to reproduce material appearance, the method comprising:

inputting appearance data including at least color information and gloss information of an object to be reproduced;

performing gloss mapping to map the gloss information into a gloss reproducible range, in which an appearance reproduction apparatus can reproduce gloss, based on information indicating an appearance reproducible range of the appearance reproduction apparatus;

obtaining a color reproducible range while keeping the gloss information after the gloss mapping, based on the information indicating the appearance reproducible range;

performing color mapping to map the color information into the color reproducible range; and generating an output signal to be outputted to the appearance reproduction apparatus, based on mapped appearance data including the color information after the color mapping and the gloss information after the gloss mapping.

29. A non-transitory computer-readable storage medium storing a computer program which causes, when read and executed by a computer, the computer to execute steps of an image processing method, the method comprising:

inputting appearance data including at least color information and gloss information of an object to be reproduced;

performing color mapping to map the color information into a color reproducible range of an appearance reproduction apparatus, based on information indicating an appearance reproducible range of the appearance reproduction apparatus;

obtaining a gloss reproducible range, in which the appearance reproduction apparatus can reproduce gloss while keeping the color information after the color mapping, based on the information indicating the appearance reproducible range;

performing gloss mapping to map the gloss information into the gloss reproducible range; and generating an output signal to be outputted to the appearance reproduction apparatus, based on mapped appearance data indicated by the color information after the color mapping and the gloss information after the gloss mapping.

* * * * *